United States Patent [19]
Yaguchi et al.

[11] Patent Number: 5,579,419
[45] Date of Patent: Nov. 26, 1996

[54] IMAGE STORING/RETRIEVING APPARATUS USING A MARK SHEET TO ENABLE USER SELECTION OF IMAGES

[75] Inventors: Hiroyuki Yaguchi, Tokyo; Keishi Inaba, Yokohama; Hidehiko Asai, Kawasaki; Makoto Kikugawa, Tokyo; Hideyuki Makitani, Fuchu; Kunio Yoshihara, Sagamihara; Hirohiko Itoh; Hidenori Ozaki, both of Kawasaki, all of Japan

[73] Assignee: Canon Kabushiki Kaisha, Tokyo, Japan

[21] Appl. No.: 61,743

[22] Filed: May 17, 1993

[30] Foreign Application Priority Data

May 19, 1992 [JP] Japan .................. 64-126142

[51] Int. Cl.$^6$ .................. G06K 9/00
[52] U.S. Cl. .................. 382/305; 382/317; 382/297
[58] Field of Search .................. 382/44, 45, 46, 382/61, 289, 291, 297, 305, 306, 317; 283/37; 364/419.19; 395/145, 146, 148, 149; 358/403

[56] References Cited

U.S. PATENT DOCUMENTS

| | | | |
|---|---|---|---|
| 4,760,247 | 7/1988 | Keane et al. .................. | 235/454 |
| 5,038,393 | 8/1991 | Nanba .................. | 382/61 |
| 5,101,448 | 3/1992 | Kawachiya et al. .................. | 382/61 |
| 5,138,140 | 8/1992 | Siemiatkowski et al. .................. | 235/462 |
| 5,204,515 | 4/1993 | Yoshida .................. | 235/456 |
| 5,224,181 | 6/1993 | Tsutsumi .................. | 382/61 |
| 5,239,388 | 8/1993 | Matsumoto .................. | 358/448 |
| 5,257,327 | 10/1993 | Hirosawa .................. | 382/56 |
| 5,282,052 | 1/1994 | Johnson et al. .................. | 358/402 |
| 5,293,431 | 3/1994 | Hayduchok et al. .................. | 382/46 |
| 5,305,397 | 4/1994 | Yamaguchi et al. .................. | 382/46 |
| 5,339,412 | 8/1994 | Fueki .................. | 395/600 |
| 5,386,298 | 1/1995 | Bronnenberg et al. .................. | 358/403 |
| 5,448,375 | 9/1995 | Cooper et al. .................. | 358/403 |

*Primary Examiner*—Andrew Johns
*Attorney, Agent, or Firm*—Fitzpatrick, Cella Harper & Scinto

[57] ABSTRACT

Image retrieving and storing processes by a mark sheet are facilitated. It is determined whether or not a mark sheet is directed in a correct direction by determining the positional relation between a direction discriminating mark and mark sheet identifying marks. If the mark sheet is directed in a wrong direction, the direction of the mark sheet is corrected. If it is determined in a primary retrieval operation that there are a plurality of candidate images, a mark sheet for a second retrieving operation is output.

28 Claims, 16 Drawing Sheets

IMAGE STORING/RETRIEVING APPARATUS USING A MARK SHEET TO ENABLE USER SELECTION OF IMAGES

BACKGROUND OF THE INVENTION

1. Field of the Invention

The present invention relates to an image storing/retrieving apparatus which is capable of filing documents effectively.

2. Description of the Related Art

In recent years, document filing apparatuses for storing and managing a large amount of documents have been used extensively in offices. In such document filing apparatuses, document data is affixed with, for example, an index representing the contents thereof, and the document is managed using that index.

In order to facilitate retrieval and storage of such document data, a document image filing apparatus employing a mark sheet which carries retrieval and storage data has been proposed.

However, such a document image filing apparatus has the following deficiency: on the mark sheet, a mark which is used to identify the mark sheet is generally printed. Therefore, the mark sheet must be placed such that it is directed in a predetermined direction in order to read that mark, which is troublesome to the user.

Furthermore, a header, which is a character serving as a keyword, is generally written on the mark sheet. Thus, it takes time for a desired image to be retrieved if an incorrect keyword is input. When there are similar images, it may be impossible to retrieve an image unless a correct condition is set.

SUMMARY OF THE INVENTION

A primary object of the present invention is to provide an image storing/retrieving apparatus which is capable of overcoming the aforementioned deficiencies of the prior art.

Another object of the present invention is to provide an image storing/retrieving apparatus which is capable of designating index data used for retrieving or storing an image regardless of the direction in which a mark sheet to be read is placed.

Another object of the present invention is to provide an image storing/retrieving apparatus which facilitates a further retrieval process when a plurality of selected images are retrieved in an image retrieval operation.

Another object of the present invention is to provide an image storing/retrieving apparatus which is capable of creating a mark sheet, suitable to each storage media in which images are stored, to facilitate a retrieval process.

To accomplish the objects of the present invention set out above, according to a preferred embodiment of the invention, there is disclosed an image storing or retrieving apparatus in which an image in a storage medium is stored or retrieved on the basis of data written on a mark sheet having a marking area used to set index data. The apparatus reads an image of the mark sheet, stores the read image of the mark sheet in a memory, discriminates a positional relation of top and bottom of the mark sheet on the basis of special data contained in the read image of the mark sheet and corrects the positional relation of top and bottom of the image of the mark sheet which has been stored in the memory when it is discriminated that the positional relation is not in a predetermined positional relation of top and bottom. The apparatus then detects a marked marking area on the basis of the image of the mark sheet which has been corrected and sets the index data on the image stored in the memory.

Other objects and advantages of the invention will become apparent from the following description of embodiments with reference to the accompanying drawings.

DETAILED DESCRIPTION OF THE PREFERRED EMBODIMENTS

An embodiment of the present invention will be described below with reference to the accompanying drawings.

Figure 1:
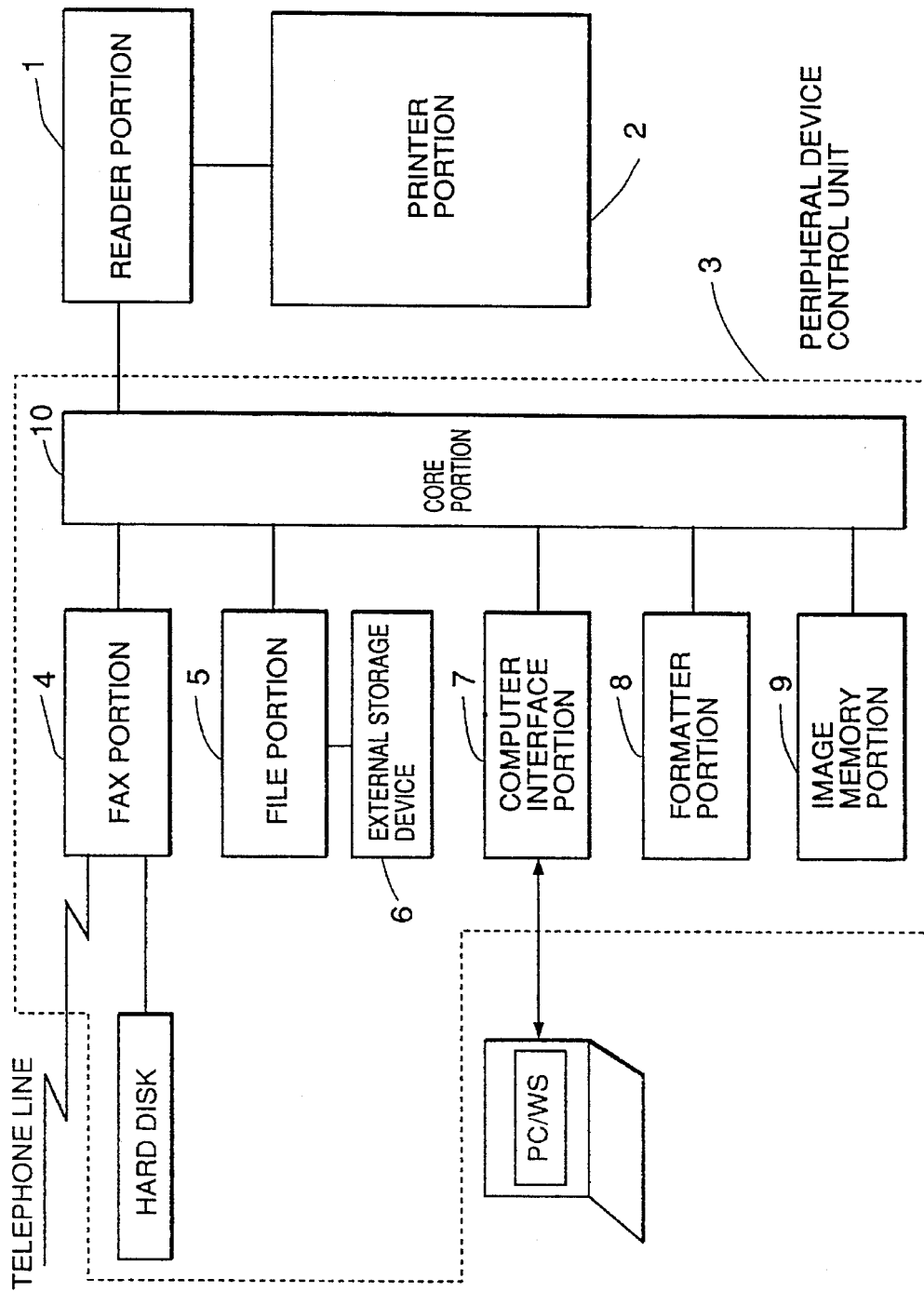
FIG. 1 illustrates an embodiment of an image storing/retrieving apparatus according to the present invention.

Referring first to FIG. 1, an image input device (hereinafter referred to as a reader portion) 1 converts a document into image data.

An image output device (hereinafter referred to as a printer) 2 has a plurality of types of recording sheet cassettes, and outputs image data on a recording sheet as a visible image according to a printing instruction.

A peripheral device control unit 3, electrically connected to the reader portion 1, has various functions which include a fax portion 4, a file portion 5, an external storage device 6 connected to the file portion 5, a computer interface portion 7 used to perform a connection to a computer, a formatter portion 8 which is used to make the data from the computer a visible image, an image memory portion 9 for storing data sent from the reader portion 1 and for temporarily storing data from the computer, and a core portion 10 for controlling the operation of the individual components.

The function of each of the components will be described below.

Reader Portion

Figure 2:
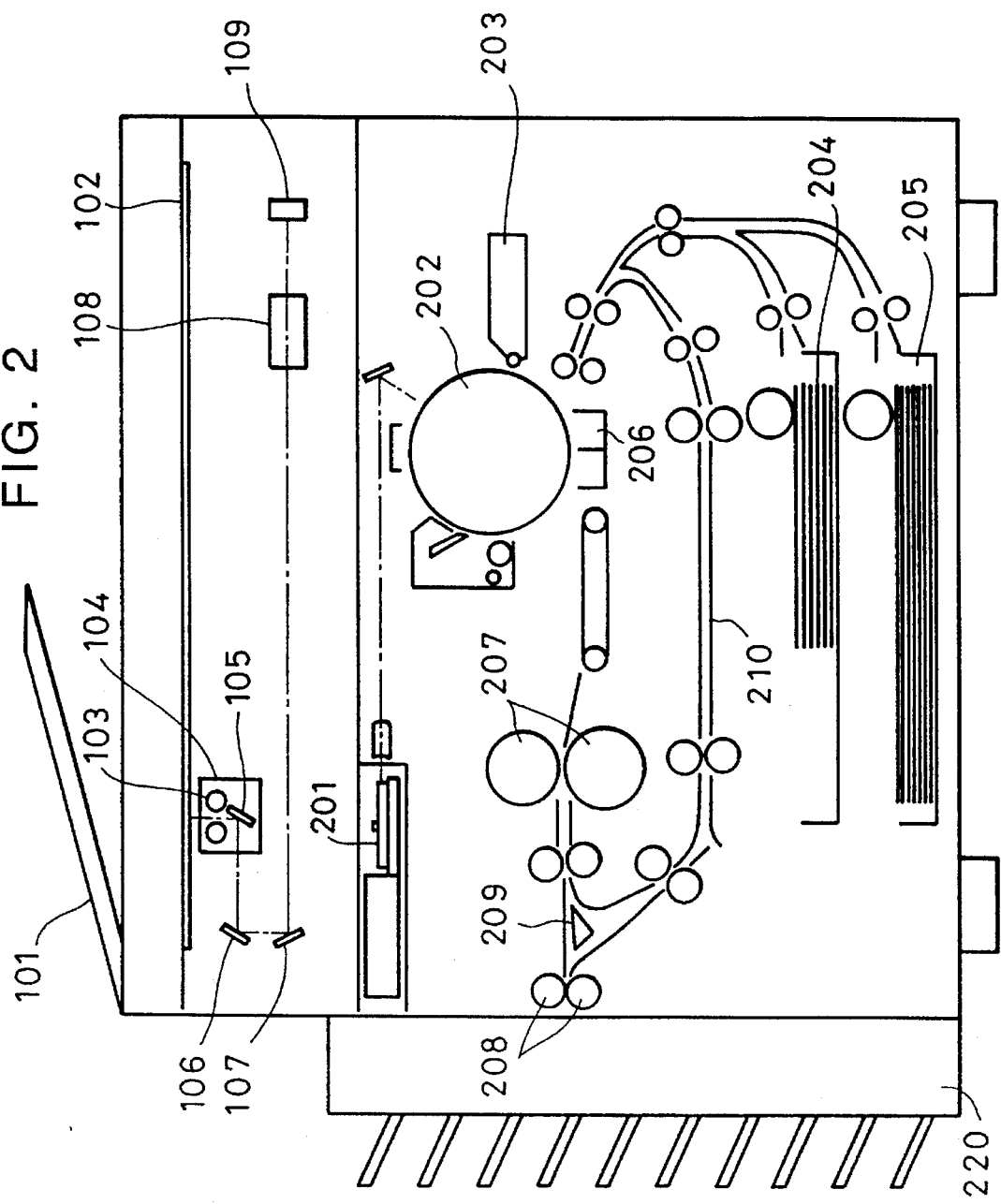
FIG. 2 is a cross-sectional view of a reader portion and a printer portion.
Figure 3:
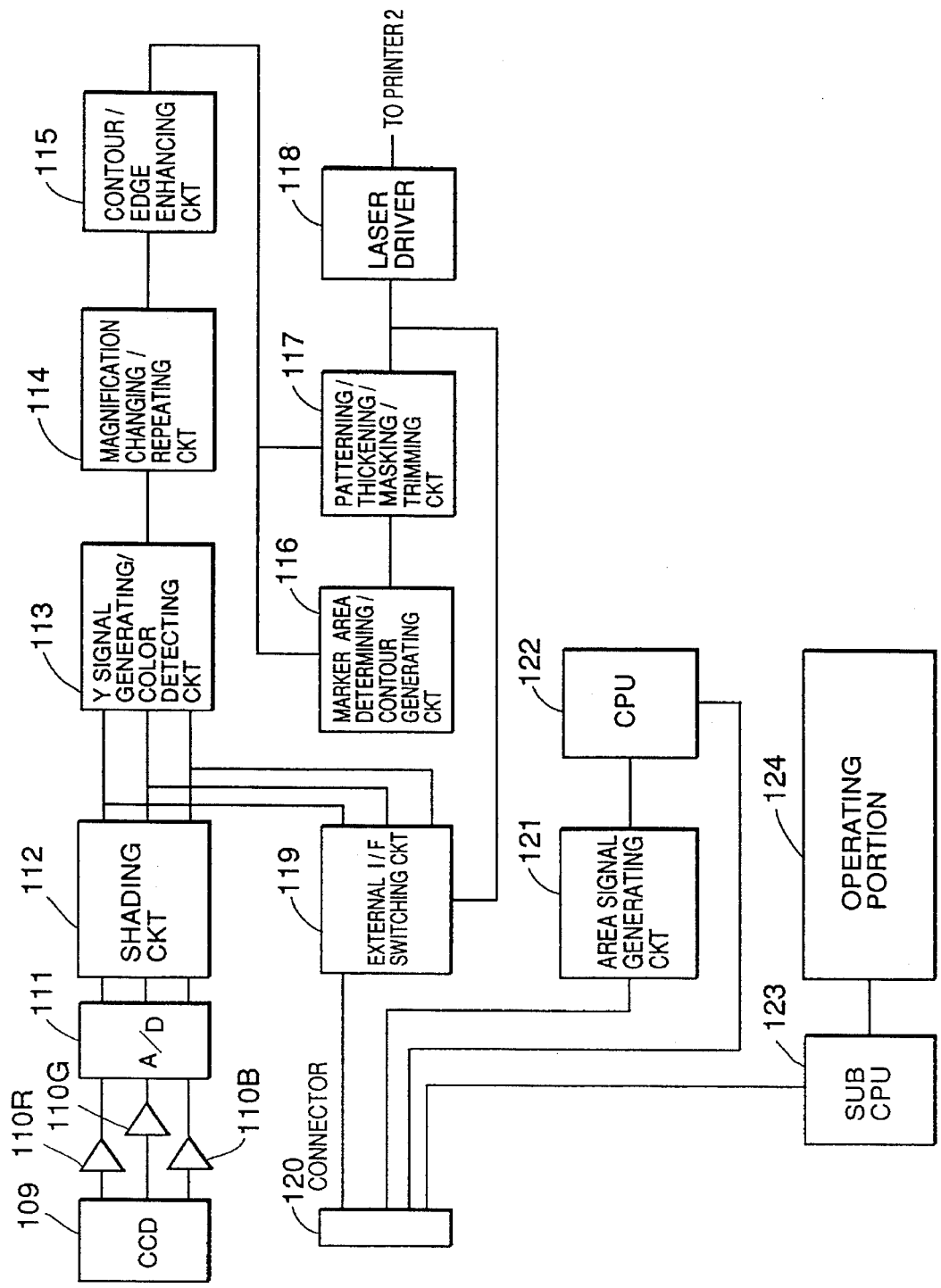
FIG. 3 is a block diagram of the reader portion.

First, the reader portion will be described in detail with reference to FIGS. 2 and 3.

Documents placed on a document feeding device 101 are sequentially conveyed onto a glass document table 102 one at a time. When a document is conveyed to the glass document table 102, lamps 103 of a scanner unit 104 are turned on and the scanner unit 104 starts moving to irradiate the documents. The light reflected by the document is reflected by mirrors 105, 106 and 107, passes through a lens 108 and is incident on a CCD image sensor portion 109 (hereinafter referred to as a CCD) having a color decomposing function.

Image processing performed in the reader 1 will be described in detail with reference to FIG. 3. The reflected light incident on the CCD 109 is photoelectrically converted into an electric signal by the CCD 109. The analog color image data from the CCD 109 is amplified by amplifiers 110R, 110G and 110B so that it matches an input signal level of an A/D converter 111. The A/D converter 111 converts the analog color image data into digital color image data, and inputs the converted image data into a shading circuit 112. The shading circuit 112 corrects light irregularities in the digital color image data due to the lamps 103 and sensitivity irregularities in the CCD 109, and outputs the corrected image data to both a Y signal generating/color detecting circuit 113 and an external I/F switching circuit 119.

The Y signal generating/color detecting circuit 113 performs the operation expressed by the following equation on the signal from the shading circuit 112 to obtain a Y signal (luminance signal).

$$Y=0.3R+0.6\ G+0.1B$$

Also, the Y signal generating/color detecting circuit 113 divides R, G and B signals into seven colors and outputs signals of respective colors. The output signal from the Y signal generating/color detecting circuit 113 is input to a magnification changing/repeating circuit 114. The magnification in the vertical direction is changed by changing the scanning speed of the scanner unit 104, and the magnification in the horizontal direction is changed by the magnification changing/repeating circuit 114. The magnification changing/repeating circuit 114 can also output the same images in a plurality of numbers. A contour/edge enhancing circuit 115 enhances the high-frequency component of the signal from the magnification changing/repeating circuit 114 to obtain edge enhanced and contour data. The signal from the contour/edge enhancing circuit 115 is input to both a marker area determining/contour generating circuit 116 and a patterning/thickening/masking/trimming circuit 117.

The marker area determining/contour generating circuit 116 reads the portion of the document which has been written by a marker pen of a designated color and generates the contour data on the marker. The patterning/thickening/masking/trimming circuit 117 thickens, masks or trims the contour data. Also, the patterning/thickening/masking/trimming circuit 117 patterns the color image using the color detecting signals from the Y signal generating/color detecting circuit 113.

The output signal from the patterning/thickening/masking/trimming circuit 117 is input to a laser driver circuit 118. The laser driver circuit 118 converts the signal which has been subjected to various processings into a signal for driving a laser. The signal from the laser driver is input to the printer 2 which forms a visible image.

The external I/F switching circuit 119 serving as an interface with the peripheral device control unit will be described below. When image data is output from the reader 1 to the peripheral device control unit 3, the external I/F switching circuit 119 outputs the image data from the patterning/thickening/masking/trimming circuit 117 to a connector 120. When image data is input from the peripheral device control unit 3 to the reader 1, the external I/F switching circuit 119 inputs the image data from the connector 120 to the Y signal generating/color detecting circuit 113.

The above-described various image processings are performed by instructions from a CPU 122. An area generating circuit 121 generates various timing signals required for the above-described image processings based on the value set by the CPU 122. Also, the area generating circuit 121 performs communications with the peripheral device control unit 3 using the communication function incorporated in the CPU 122. A SUB•CPU 123 controls an operating portion 124 and performs communications with the peripheral device control unit 3 using the communication function incorporated therein.

Printer Portion

The image signal input to the printer portion 2 is input to an exposure control portion 201. The exposure control portion 201 converts the image signal into a light signal to irradiate a photosensitive member 202 with the light signal. A developer 203 develops a latent image formed on the photosensitive member 202 by the illumination light. A transfer sheet is conveyed from a transfer sheet loading portion, 204 or 205, synchronously with the latent image formation, and the developed image is transferred onto that transfer sheet by a transfer portion 206. The transferred image is fixed to the transfer sheet by a fixing portion 207. A sheet discharge portion 208 discharges the transfer sheet onto which the transfer image has been fixed to the outside of the printer. When the sorting function is selected, the transfer sheets output from the sheet discharge portion 208 are sorted to individual bins of a sorter 220. When the sorting function is not selected, the transfer sheets are discharged onto the top bin of the sorter 220.

The method of outputting the sequentially read images onto the two surfaces of a sheet of paper will now be described. The transfer sheet which has been subjected to the fixing process by the fixing portion 207 is conveyed to the sheet discharge portion 208. Thereafter, the direction in which the rollers of the sheet discharge portion 208 are rotated is reversed to switch back the transfer sheet. The transfer sheet is conveyed to a transferred sheet loading portion 210 through a conveying direction changing-over member 209. When a subsequent document is prepared, the document image is read by the same process as the previous one. The read image is transferred onto the rear surface of the transfer sheet supplied from the transferred sheet loading portion 210, whereby an output sheet with the images of two documents formed on both surfaces of the transfer sheet is obtained.

Peripheral Device Control Unit

The core portion 10 of the peripheral device control unit 3, connected to the reader 1 via a cable, performs control of signals and various functions. The peripheral device control unit 3 includes the fax portion 4 for performing facsimile transmission, the file portion 5 for changing image data into an electric signal and for storing the converted electric signal onto a recording medium, such as a magnetic-optical disk, the formatter portion 8 for converting the code data from a computer into image data, the computer interface portion 7 for interfacing with the computer, the image memory 9 for storing the data from the reader portion 1 and for temporarily storing the data from the computer, and the core portion 10 for controlling the above respective functions.

The individual function of each portion will now be described in detail.

Core Portion

Figure 4:
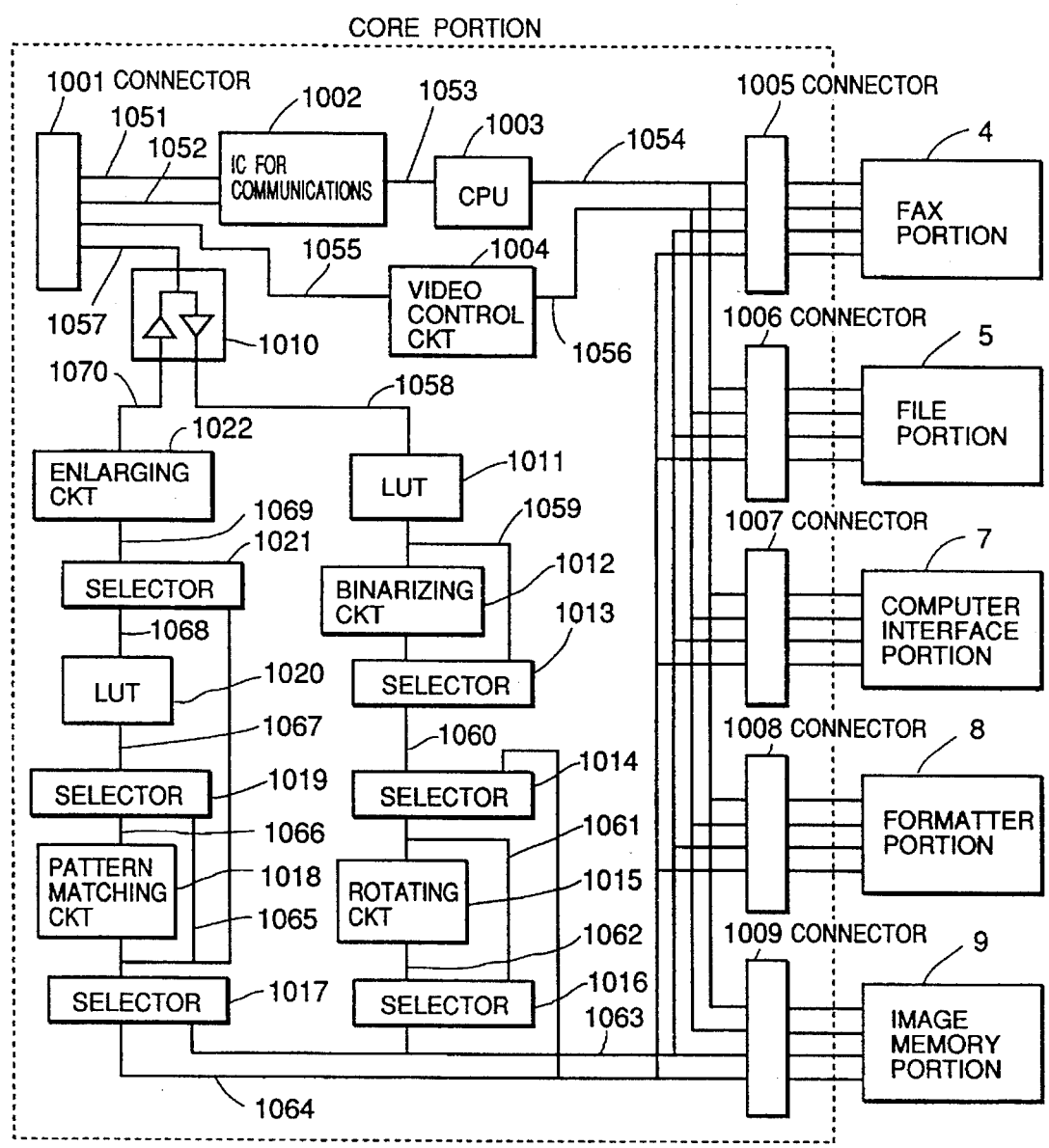
FIG. 4 is a block diagram of a core portion.

Referring to FIG. 4, a connector 1001 of the core portion 10 is connected to the connector 120 of the reader portion 1 via a cable.

The connector 1001 incorporates four types of signal lines. In these signal lines, a signal line 1057 is a 8-bit multilevel video signal line, a signal line 1055 controls a video signal, a signal line 1051 performs communications with the CPU 122 in the reader 1, and a signal line 1052 performs communications with the SUB/CPU 123 in the reader 1. The signal lines 1051 and 1052 are subjected to a communication protocol process to transmit communication data to a CPU 1003 via a CPU bus 1053.

The signal line 1057 is a bi-directional video signal line which enables the data from the reader portion 1 to be received by the core portion 10 and enables the data from the core portion 10 to be output to the reader portion 1. The signal line 1057 is connected to a buffer 1010 where the bi-directional signal line 1057 is divided into uni-directional signal lines 1058 and 1070. The signal line 1058 is a video signal line for an 8-bit multilevel signal from the reader portion 1, and is connected to an LUT 1011. The LUT 1011 converts the image data from the reader portion 1 into a desired density value using a look-up table. An output signal line 1059 from the LUT 1011 is connected to both a binarizing circuit 1012 and a selector 1013. The binarizing circuit 1012 has the binarizing function of binarizing the signal on the multilevel signal line 1059 using a fixed slice level, the binarizing function which employs a variable slice level which varies according to the density values of the pixels located around an objective pixel, and the binarizing function which employs the error diffusion method. When the obtained binarized data is 0, the data is converted into a multilevel signal 00H. When the binarized data is 1, the data is converted into a multilevel signal FFH. The converted multilevel signal is input to a subsequent selector 1013. The selector 1013 selects either the signal from the LUT 1011 or the output signal of the binarizing circuit 1012. A signal line 1060 from the selector 1013 is connected to a selector 1014. The selector 1014 selects either (1) the signal on a signal line 1064 which is input to the core portion 10 from the fax portion 4, the file portion 5, the computer interface portion 7, the formatter portion 8 or the image memory portion 9, through a connector 1005, 1006, 1007, 1008 or 1009, or (2) the signal on the output signal line 1060 of the selector 1013, according to the instruction from the CPU 1003. A signal on an output signal line 1061 of the selector 1014 is input to either a rotating circuit 1015 or a selector 1016. The rotating circuit 1015 has the function of rotating the input image signal by either +90 degrees, −90 degrees or +180 degrees. The rotating circuit 1015 stores, as the data from the reader portion, the binary signal obtained by binarizing the data output from the reader portion 1 by the binarizing circuit 1012. Next, the rotating circuit rotates the stored data according to the instruction from the CPU 1003 and reads out the rotated data. The selector 1016 selects either a signal on an output signal line 1062 of the rotating circuit 15, or a signal on the input signal line 1061 of the rotating circuit 1015. The selector 1016 outputs the selected signal, as a signal on a signal line 1063, to the connector 1005 for the fax portion 4, the connector 1006 for the file portion 5, the connector 1007 for the computer interface portion 7, the connector 1008 for the formatter portion 8, the connector 1009 for the image memory portion 9, or a selector 1017.

The signal line 1063 is a uni-directional video bus for a synchronous 8-bit system which performs transfer of image data from the core portion 10 to the fax portion 4, the file portion 5, the computer interface portion 7, the formatter portion 8 or the image memory portion 9. The signal line 1064 is a uni-directional video bus for a synchronous 8-bit system which transfers image data from the fax portion 4, the file portion 5, the computer interface portion 7, the formatter portion 8 or the image memory portion 9. The synchronous buses of the signal lines 1063 and 1064 are controlled by a video control circuit 1004. The video control circuit 1004 performs control by a signal on an output signal line 1056 thereof. In addition to the signal line 1056, a signal line 1054 is connected to the respective connectors 1005 through 1009. The signal line 1054 is a bi-directional 16-bit CPU bus which exchanges data commands asynchronously. Transfer of data between the core portion 10 and the fax portion 4, the file portion 5, the computer interface portion 7, the formatter portion 8 or the image memory portion 9 is enabled by the two video buses 1063 and 1064 and the CPU bus 1054.

A signal on the signal line 1064 from the fax portion 4, the file portion 5, the computer interface portion 7, the formatter portion 8 or the image memory portion 9, is input to both selectors 1014 and 1017. The selector 1014 inputs the signal on the signal line 1064 to the subsequent rotating circuit 1015 on the basis of the instruction from the CPU 1003.

The selector 1017 selects either the signal on the signal line 1063 or the signal on the signal line 1064 based on the instruction from the CPU 1003. A signal on an output signal line 1065 of the selector 1017 is input to both a pattern matching circuit 1018 and a selector 1019. The pattern matching circuit 1018 performs pattern matching on the signal on the signal line 1065 using a predetermined pattern, and outputs a predetermined multilevel signal on a signal line 1066 when the two patterns match. When the two patterns do not match, the pattern matching circuit 1018 outputs the signal on the signal line 1065 to the signal line 1066.

The selector 1019 selects either the signal on the signal line 1065 or the signal on the signal line 1066 based on the instruction from the CPU 1003. The output signal of the selector 1019 is input to a subsequent LUT 1020 via a signal line 1067.

The LUT 1020 converts the signal on the signal line 1067 so that it matches the characteristics of the printer when outputs the image data to the printer 2.

A selector 1021 selects either a signal on an output signal line 1068 of the LUT 1020 or a signal on the signal line 1065 based on the instruction of the CPU 1003. A signal on an output signal line of the selector 1021 is input to a subsequent enlarging circuit 1022.

The enlarging circuit 1022 can set the enlargement factor in X (vertical) and Y (horizontal) directions independently based on the instruction from the CPU 1003. A primary linear interpolation method is employed as the enlargement method. A signal on an output signal line 1070 of the enlarging circuit 1022 is input to the buffer 1010.

The signal on the signal line 1070 which is input to the buffer 1010 passes through the signal line 1057 and is sent to the printer 2 via the connector 1001 for printing.

The flow of a signal between the core portion and the respective components will now be described.

The Operation of the Core Portion by the Data of the Fax Portion

Data is output to the fax portion 4 in the manner described below. The CPU 1003 performs communications with the CPU 122 of the reader portion 1 through the IC for communications 1002 to output a document scanning instruction. The reader portion 1 scans the document by the scanner unit 104 on the basis of that scanning instruction, and outputs the read image data to the connector 120. The reader portion 1 is connected to the peripheral device control unit 3 via a cable. Therefore, the data from the reader portion 1 is input to the connector 1001 of the core portion 10. The image data input to the connector 1001 passes through the multilevel 8-bit signal line 1057 and is then input to the buffer 1010. The buffer circuit 1010 inputs the signal on the bi-directional signal line 1057 to the LUT 1011 via the signal line 1058 as a uni-directional signal based on the instruction from the CPU 1003. The LUT 1011 converts the image data from the reader portion 1 into a desired density value using the look-up table. For example, the LUT 1011 can skip the background of the document. The signal on the output signal line 1059 of the LUT 1011 is input to the subsequent binarizing circuit 1012. The binarizing circuit 1012 converts the 8-bit multilevel signal on the signal line 1059 into a binary signal. When the obtained binary signal is 0, the binarizing circuit 1012 converts the binary signal into a multilevel signal 00H. When the obtained binary signal is 1, it is converted into a multilevel signal FFH by the binarizing circuit 1012. The output signal of the binarizing circuit 1012 passes through the selectors 1013 and 1014 and is then input to both the rotating circuit 1015 and the selector 1016. The signal on the output signal line 1062 of the rotating circuit 1015 is also input to the selector 1016, and the selector 1016 selects either the signal on the signal line 1061 or the signal on the signal line 1062. The signal that is selected is determined by the results of the communications which is performed by the CPU 1003 with the fax portion 4 via the CPU bus 1054. The signal on the output signal line 1063 from the selector 1016 is sent to the fax portion 4 through the connector 1005.

Data is received from the fax portion 4 in the manner described below. The image data from the fax portion 4 is transferred to the signal line 1064 through the connector 1005. The signal on the signal line 1064 is input to both the selectors 1014 and 1017. When it is instructed by the CPU 1003 that the image received by the fax portion 4 is to be rotated and then output to the printer 2, the signal on the signal line 1064 which is input to the selector 1014 is rotated by the rotating circuit 1015. The signal on the output signal line 1062 of the rotating circuit 1015 passes through the selectors 1016 and 1017 and is then input to the pattern matching circuit 1018. When it is instructed by the CPU 1003 that the image received by the fax portion 4 is to be output to the printer 2 without change, the signal on the signal line 1064 which is input to the selector 1017 is input to the pattern matching circuit 1018.

The pattern matching circuit 1018 has a smoothing function of smoothing the irregularities of the inclined portion of the image received by the fax portion 4. The pattern matched signal is input to the LUT 1020 through the selector 1019. The LUT 1020 is constructed such that the table in the LUT 1020 can be varied by the CPU 1003 in order to allow the image received by the fax to be output to the printer 2 at a desired density. The signal on the output signal line 1068 of the LUT 1020 is input to the enlarging circuit 1022 through the selector 1021. The enlarging circuit 1022 enlarges the 8-bit multilevel signal which can take either of two values (00H, FFH) by the primary linear interpolation method. The 8-bit multilevel signal having a value ranging from 00H to FFH and output from the enlarging circuit 1022 is sent to the reader portion 1 through the buffer 1010 and connector 1001. The reader portion 1 inputs the received signal to the external I/F switching circuit 119 through the connector 120. The external I/F switching circuit 119 inputs the signal from the fax portion 4 to the Y signal generating/color detecting circuit 113. The output signal from the Y signal generating/color detecting circuit 113 is subjected to the above-described processing and is then output to the printer 2 to form an image on the output sheet.

The Operation of the Core Portion by the Data of the File Portion

Data will be output from the core portion 10 to the file portion 5 in the manner described below. The CPU 1003 performs communications with the CPU 122 of the reader portion 1 through the IC for communications 1002 to give a document scanning instruction. In response to this instruction, the reader portion 1 makes the scanner unit 104 scan the document, and outputs the read image data to the connector 120. Since the reader portion 1 is connected to the peripheral device control unit 3 via the cable, the data from the reader portion 1 is input to the connector 1001 of the core portion 10. The image data input to the connector 1001 is transmitted to the uni-directional signal line 1058 by the buffer 1010. The 8-bit multilevel signal on the signal line 1058 is converted into a desired density value signal by the LUT 1011. The signal on the output signal line 1059 of the LUT 1011 passes through the selector 1013, the selector 1014 and then the selector 1016, and is input to the connector 1006, that is, the signal on the output signal line 1059 is transferred to the file portion 5 without using the function of the binarizing circuit 1012 and that of the rotating circuit 1015 in the form of an 8-bit multilevel signal. When filing of the binary signal is performed by the communications with the file portion 5 via the CPU bus 1054 of the CPU 1003, the function of the binarizing circuit 1012 and that of the rotating circuit 1015 are used. Since the binarizing and rotating processes are the same as those of the case in the fax portion, description thereof is omitted.

Data is output from the file portion 5 in the manner described below. The image data from the file portion 5 is input to either the selector 1014 or the selector 1017 via the connector 1006 and the signal lien 1064. When the filed data is an 8-bit multilevel signal, the image data from the file portion 5 is input to the selector 1017. In the case of a filing of a binary signal, the image data from the file portion 5 can be input to either the selector 1014 or the selector 1017. In the case of filing of a binary signal, the binary signal is processed in the same manner as that of the fax portion, and description thereof is therefore omitted. In the case of filing of a multilevel signal, the signal on the output signal line 1065 from the selector 1017 is input to the LUT 1020 through the selector 1019. The LUT 1020 creates a look-up table according to a desired printing density by the instruction from the CPU 1003. The signal on the output signal line 1068 of the LUT 1020 is input to the enlarging circuit 1022 through the selector 1021. The signal on the multilevel signal line 1070 which has been enlarged by a desired enlargement factor by the enlarging circuit 1022 is sent to the reader portion 1 via the buffer 1010 and the connector 1001. The data of the file portion which has been sent to the reader portion 1 is output to the printer 2 in the same manner as that of the fax to form an image on the output sheet.

The Operation of the Core Portion by the Data of the Computer Interface Portion The computer interface portion 7 interfaces with the computer connected to the peripheral device control unit 3. Three types of interfaces, SCSI, RS232C and Centronics, are used as the computer interfaces in the computer interface portion 7. The data from each of the interfaces is sent to the CPU 1003 via the connector 1007 and the data bus 1054. The CPU 1003 performs various controls corresponding to the received contents.

The Operation of the Core Portion by the Data of the Formatter Portion

The formatter portion 8 has the function of converting the command data, such as a document file, sent from the computer interface portion 7, into image data. When it is determined that the data sent from the computer interface portion 7 via the data bus 1054 is associated with the formatter portion 8, the CPU 1003 transfers the data to the formatter portion 8 via the connector 1008. The formatter portion 8 stores the transferred data in the image data memory.

The way in which the data from the formatter portion 8 is received and output onto the output sheet will now be described. The image data from the formatter portion 8 is transmitted to the signal line 1064 via the connector 1008 as a multilevel signal having either of the two values (00H, FFH). The signal on the signal line 1064 is input to both the selectors 1014 and 1017 which are controlled by the instruction from the CPU 1003. Thereafter, since the signal is processed in the same manner as that of the fax portion, description thereof is omitted.

The Operation of the Core Portion by the Data of the Image Memory Portion

Data is output to the image memory portion 9 in the manner described below. The CPU 1003 performs communications with the CPU 122 of the reader portion 1 through the IC communications 1002 to give the document scanning instruction. The reader portion 1 makes the scanner unit 104 scan the document on the basis of that instruction, and outputs the read image data to the connector 120. The data from the reader portion 1 is input to the connector 1001 of the core portion 10. The image data input to the connector 1001 is sent to the LUT 1011 via the 8-bit multilevel signal line 1057 and the buffer 1010. The signal on the output signal line 1059 of the LUT 1011 is transferred to the image memory portion 9 via the selector 1013, the selector 1014, the selector 1016 and then the connector 1009. The image data stored in the image memory portion 9 is sent to the CPU 1003 via the connector 1009 and the CPU bus 1054. The CPU 1003 transfers the data which has been sent from the image memory portion 9 to the computer interface portion 7. The computer interface portion 7 transfers the data to the computer using a desired interface selected from the above-mentioned three types of interfaces (SCSI, RS232C, Centronics).

Data is received from the image memory portion 9 in the manner described below: first, image data is sent from the computer to the core portion 10 via the computer interface portion 7. When the CPU 1003 in the core portion 10 determines that the data which has been sent from the computer interface portion 7 via the CPU bus 1054 is associated with the image memory portion 9, it transfers that data to the image memory portion 9 via the connector 1009. Next, the image memory portion 9 transfers the 8-bit multilevel signal on the signal line 1064 to both selectors 1014 and 1017. The output signal from either the selector 1014 or the selector 1017 is output to the printer 2 in the same manner as that of the fax portion to form an image on the output sheet.

Fax Portion

Figure 5:
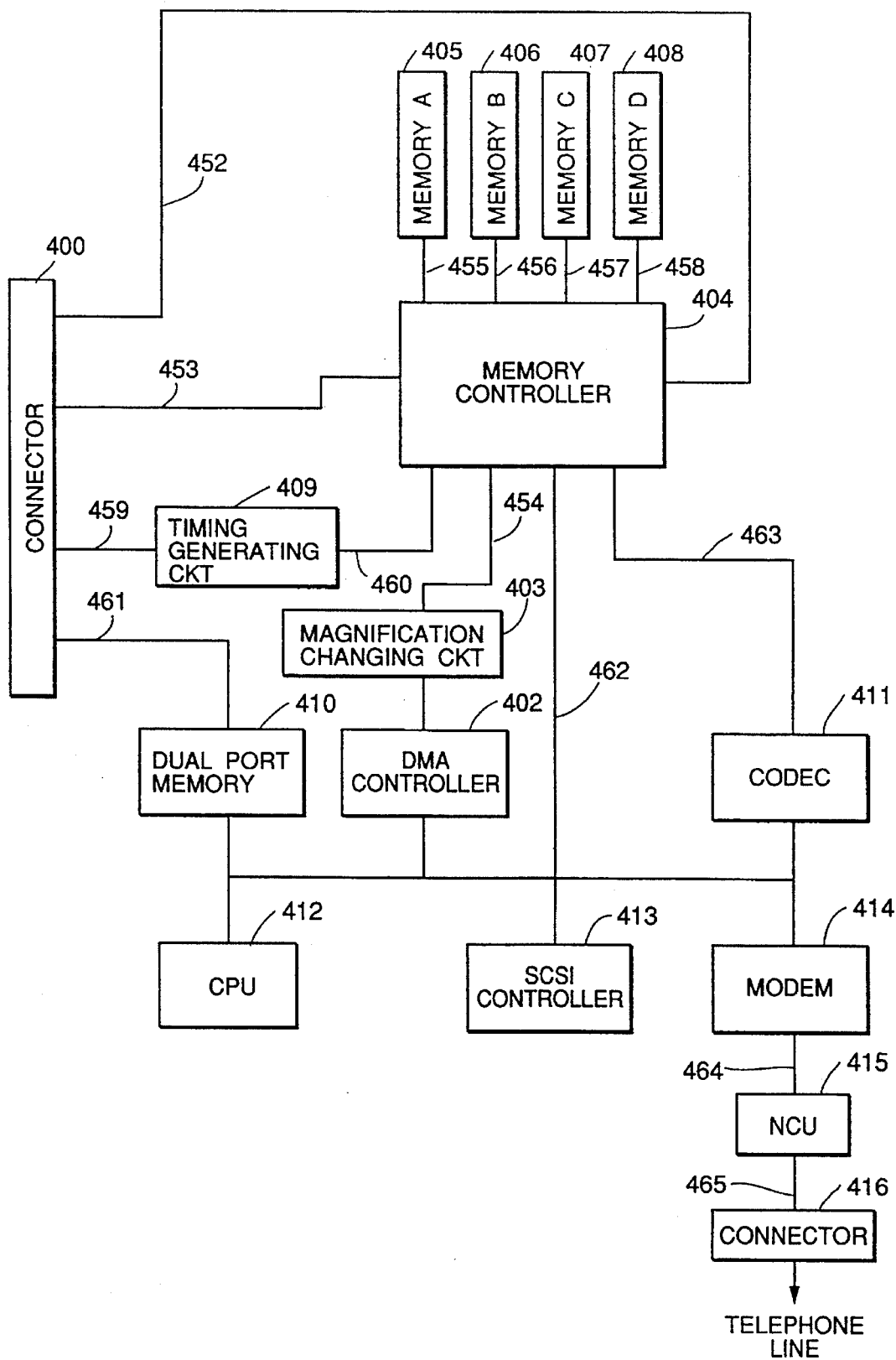
FIG. 5 is a block diagram of a fax portion.

The fax portion 4 will be described below in detail with reference to FIG. 5.

The fax portion 4 is connected to the core portion 10 via a connector 400 and exchanges various signals with the core portion 10. When the binary data from the core portion 10 is to be stored in either of memories A, 405 through memory D, 408, a signal 453 from the connector 400 is input to a memory controller 404, and is then stored in either of memory A 405, memory B 406, memory C 407, or memory D 408, or any pair of cascade-connected memories under the control of the memory controller 404. The memory controller 404 has five operation modes consisting of (1) the operation mode in which data is exchanged between memory A 405, memory B 406, memory C 407 or memory D 408, and a CPU bus 462, under the instruction of the CPU 412; (2) the operation mode in which data is exchanged with a CODEC bus 463 of a CODEC 411 having the coding and decoding function; (3) the operation mode in which the contents of memory A 405, memory B 406, memory C 407 or memory D 408 are exchanged with a bus 454, of a magnification factor changing circuit 403, under the control of a DMA controller 402; (4) the operation mode in which binary video input data 460 is stored in either of memory A 405, memory B 406, memory C 407 or memory D 408, under the control of a timing generating circuit 409; and (5) the operation mode in which the contents of memory A 405, memory B 406, memory C 407 or memory D 408 are read out and output to a signal line 452. Each of memory A 405, memory B 406, memory C 407 and memory D 408 has a capacity of 2 M bytes, and stores an image corresponding to A4 size at a resolution of 400 dpi. The timing generating circuit 409 is connected to the connector 400 via a signal line 459, and is activated by a control signal from the core portion 10 (which includes HSYNC, HEN, VSYNC, VEN) to generate signals which achieve the following two functions: one, the function of storing the image signal from the core portion 10 in any of memories A 405 through D 408 or in two memories, and the other function of reading out the image signal from any of memories A 405 through D 408 and of transferring the read image signal to the signal line 452. A dual port memory 410 is connected to the CPU 1003 of the core portion 10 via a signal line 461 and to a CPU 412 of the fax portion 4 via a signal line 462. The individual CPUs exchange commands through the dual port memory 410. A SCSI controller 413 performs interface with a hard disk connected to the fax portion 4, as shown in FIG. 1, to store data which is to be facsimile transmitted or which is facsimile received. The CODEC 411 reads out the image data stored in any of memories A 405 through D 408, encodes the read image data by any desired coding scheme of MH, MR or MMR scheme, and then stores the coded data in any of memories A 405 through D 408. Also, the CODEC 411 reads out the coded data stored in any of memories A 405 through D 408, decodes the read coded data by any desired scheme of MH, MR or MMR scheme, and then stores the decoded data, i.e., the image data, in any of memories A 405 through D 408. A MODEM 414 has the function of modulating the coded data from either the CODEC 411 or the hard disk connected to the SCSI controller 413 so that it can be sent to a telephone line, the function of demodulating the data sent from a NCU 415, converting the demodulated data into coded data, and transferring the coded data to either the CODEC 411 or the hard disk connected to the SCSI controller 413. The NCU 415 is connected directly to the telephone line and exchanges data with a switchboard installed in a central telephone exchange office or the like by predetermined procedures.

Facsimile transmission will be conducted in the manner described below. The binary image signal from the reader portion 1 is input from the connector 400, passes through the signal line 453 and reaches the memory controller 404. The binary image signal which has been transferred to the signal line 453 is stored in memory A 405 by the memory controller 404. The timing at which the binary image signal is stored in memory A 405 is determined by the timing generating circuit 409, by the timing signal transmitted from the reader portion 1 via the signal line 459. The CPU 412 connects both a signal line 455 of memory A 405 and a signal line 456 of memory B 406, to the bus line 463 of the CODEC 411, by controlling the memory controller 404. The CODEC 411 reads out the image data from memory A 405, encodes the read image data by the MR scheme, and writes the coded data in memory B 406. When the image data corresponding to A4 size has been coded by the CODEC 411, the CPU 412 connects the signal line 456 of memory B 406 to the CPU bus 462 by controlling the memory controller 404. The CPU 412 sequentially reads out the coded data from memory B 406 to transfer the read coded data to the MODEM 414. The MODEM 414 modulates the coded data and transmits the coded data onto the telephone line via the NCU 415.

The data which arrives through the telephone line is input to the NCU 415, which is connected to the telephone line, by predetermined procedures. The data from the NCU 415 is demodulated by the MODEM 414. The CPU 412 stores the data from the MODEM 414 in memory C 407 via the CPU bus 462. When the data representing one page has been stored in memory C 407, the CPU 412 connects the data line 457 of memory C 407 to the line 463 of the CODEC 411 by controlling the memory controller 404. The CODEC 411 sequentially reads out the coded data from memory C 407, decodes the read data, and stores the decoded data in memory D 408 as the image data. The CPU 412 performs communications with the CPU 1003 of the core portion 10 through the dual port memory 410 to perform settings required to print out an image from memory D 408 to the printer 2 through the core portion 10. After the settings are completed, the CPU 412 activates the timing generating circuit 409 to output a predetermined timing signal to the memory controller 404 via the signal line 460. The memory controller 404 reads out the image data from memory D 408 synchronously with the signal from the timing generating circuit 409 and transmits the read image data to the connector 400 via the signal line 452. The image data is output from the connector 400 to the printer 2 in the same manner as that described in connection with the core portion.

File Portion

Figure 6:
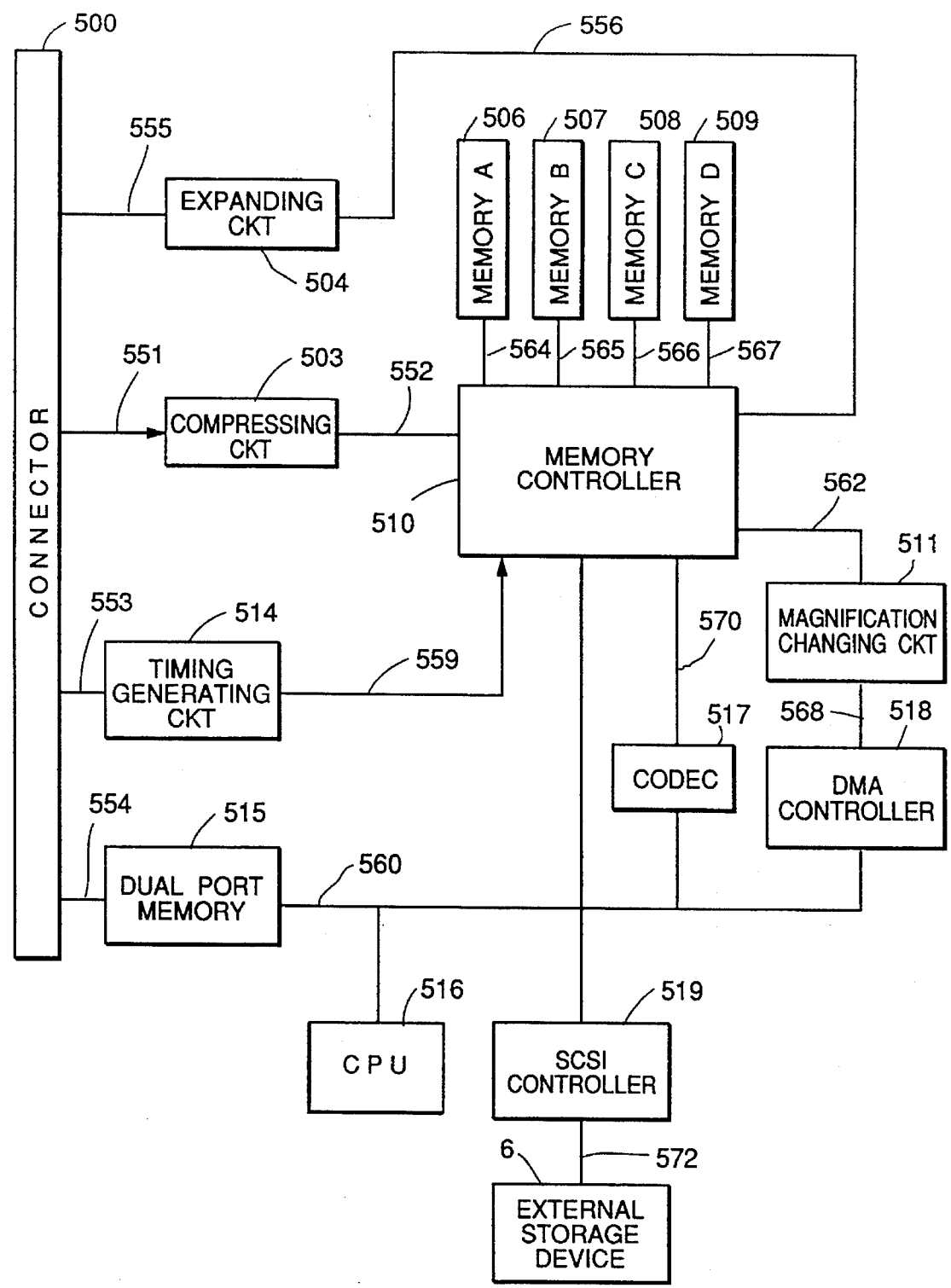
FIG. 6 is a block diagram of a file portion.

The file portion will be described in detail with reference to FIG. 6.

The file portion 5 is connected to the core portion 10 via a connector 500 to exchange various signals with the core portion 10. A multilevel image signal on a signal line 551 is input to a compressing circuit 503. The compressed signal on an output signal line 552 of the compressing circuit 503 is stored in any of memory A 506, memory B 507, memory C 508 and memory D 509, or any pair of cascade-connected memories under the control of the memory controller 510. The memory controller 510 has five operation modes consisting of the first operation mode in which data is exchanged between memory A 506, memory B 507, memory C 508 or memory D 509, and a CPU bus 560 under the instruction of the CPU 516; the second operation mode in which data is exchanged with a CODEC bus 570 of a CODEC 517 having the coding and decoding function; the third operation mode in which the contents of memory A 506, memory B 507, memory C 508 or memory D 509, are exchanged with a bus 562 of a magnification factor changing circuit 511 under the control of a DMA controller 518; the fourth operation mode in which a signal on a signal line 563 is stored in any of memory A 506, memory B 507, memory C 508 or memory D 509, under the control of a timing generating circuit 514; and the fifth operation mode in which the contents of memory A 506, memory B 507, memory C 508 or memory D 509, are read out and output to a signal line 558. Each of memory A 506, memory B 507, memory C 508 and memory D 509 has a capacity of 2 M bytes, and stores an image corresponding to A4 size at a resolution of 400 dpi. The timing generating circuit 514 is connected to the connector 500 via a signal line 553, and is activated by a control signal from the core portion 10 (which includes HSYNC, HEN, VSYNC, VEN) to generate signals which achieve the following two functions: one, the function of storing the data from the core portion 10 in any of memories A 506 through D 509 or in two memories, and the other function of reading out the image signal from any of memories A 506 through D 509 and of transferring the read image signal to the signal line 556. A dual port memory 515 is connected to the CPU 1003 of the core portion 10 via a signal line 554 and to the CPU 516 of the file portion 5 via a signal line 560. The individual CPUs exchange commands through the dual port memory 515. A SCSI controller 519 interfaces with the external storage device 6 connected to the file portion 5, as shown in FIG. 1, to store data, such as image data, in the external storage device 6 which may be an optical magnetic memory. The CODEC 517 reads out the image data stored in any of the memories A 506 through D 509, encodes the read image data by any desired coding scheme of MH, MR or MMR scheme, and then stores the coded data in any of memories A 506 through D 509. Also, the CODEC 517 reads out the coded data stored in any of memories A 506 through D 509, decodes the read coded data by any desired scheme of MH, MR or MMR scheme, and then stores the decoded data, i.e., the image data, in any of memories A 506 through D 509.

File data is stored in the external storage device in the manner described below: an 8-bit multilevel image signal from the reader portion 1 is input to the connector 500. The input image signal passes through the signal line 551 and is then input to the compressing circuit 503. The compressed data obtained by the compressing circuit 503 is input to the memory controller 510 via the signal line 552. The timing generating circuit 514 generates a timing signal using the signal which has been transmitted from the core portion 10 via the signal line 553, and outputs the generated timing signal to the signal line 559. The memory controller 510 stores the compressed signal on the signal line 552 in memory A 506 by that timing signal. The CPU 516 connects both memories A 506 and memory B 607 of the memory controller 510 to the bus line 570 of the CODEC 517. The CODEC 517 codes the compressed data which has been read out from memory A 506 by the MR scheme. The coded data is written in memory B 507. When the CODEC 517 has completed coding, the CPU 516 connects memory B 507 of the memory controller 510 to the CPU bus 560. The CPU 516 sequentially reads out the coded data from memory B 507, and transfers the read coded data to the SCSI controller 519. The SCSI controller 519 stores the coded data in the external storage device 6 via a signal line 572.

The data taken out from the external storage device 6 is output to the printer 2 in the manner described below: On receipt of a command of retrieving/printing data, the CPU 516 receives the coded data from the external storage device 6 through the SCSI controller 519, and transfers that coded data to memory C 508. At that time, the memory controller 510 connects the CPU bus 560 to the bus 566 of memory C508 under the instruction of the CPU 516. When transfer of the coded data to memory C 508 has been completed, the CPU 516 connects both memories C 508 and D 509 to the bus 570 of the CODEC 517 by controlling the memory controller 510. The CODEC 517 inputs the coded data from memory C 508, decodes it and then transfers the decoded data to the memorycontroller 510. The memory controller 510 stores the decoded data in memory D 509.

When the magnification factor changing process, such as enlargement or reduction, should be conducted on the image data output from the printer, the image data read out from memory D 509 is output to the magnification factor changing circuit 511 via the signal line 562 and is enlarged or reduced under the control of the DMA controller 518. The CPU 516 performs communications with the CPU 1003 of the core portion 10 through the dual port memory 515 to perform settings required to print out the image to the printer 2 from memory D 509 through the core portion 10. After the settings have been completed, the CPU 516 activates the timing generating circuit 514 to output a predetermined timing signal to the memory controller 510 from the signal line 559. The memory controller 510 reads out the decoded data from memory D 509 synchronously with the signal from the timing generating circuit 514, and transfers the read data to the signal line 556. The signal on the signal line 556 is input to the expanding circuit 504. The output signal expanded by the expanding circuit 504 is output to the core portion 10 through the signal line 555 and the connector 500. The way in which the data is output from the connector 500 to the printer 2 has been described in connection with the core portion 10, and therefore description thereof is omitted.

Computer Interface Portion 7

Figure 7:
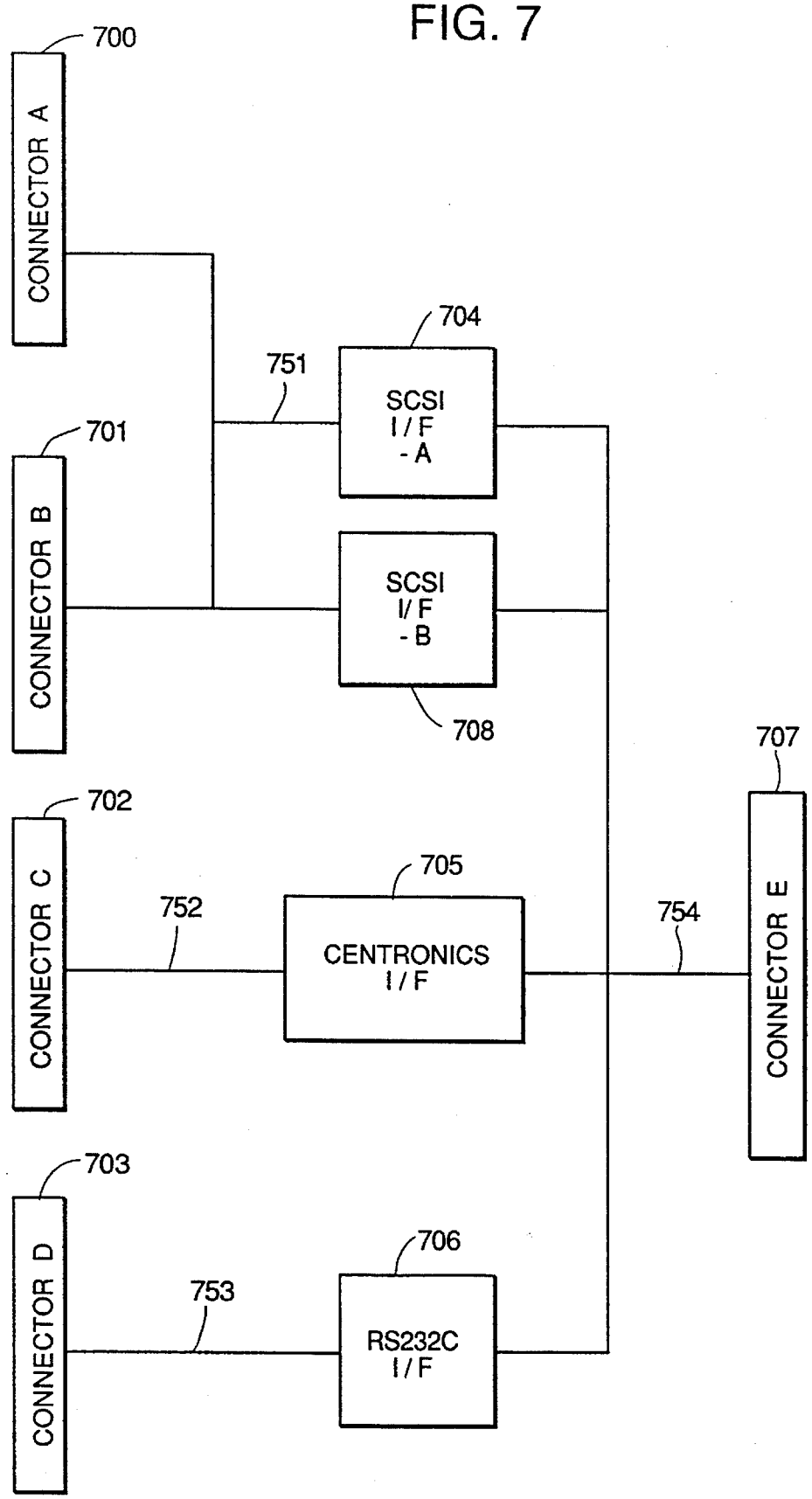
FIG. 7 is a block diagram of a computer interface portion.

The computer interface portion 7 will be described with reference to FIG. 7.

Connectors A 700 and B 701 are for SCSI interfaces. A connector C 702 is for a Centronics interface. A connector D 703 is for a RS232C interface. A connector E 707 is used for connection with the core portion 10.

A SCSI interface has two connectors (connectors A 700 and B 701). When a device having a plurality of SCSI interfaces is connected, these SCSI interfaces are cascade-connected using connectors A 700 and B 701. When the peripheral device control unit 3 is to be connected to a computer one-to-one correspondence, the connector A 700 may be connected to the computer via a cable, while a connector B 701 may be connected to a terminator. Alternatively, the connector B 701 may be connected to the computer while the connector A 700 may be connected to a terminator. The data input from either the connector A 700 or the connector B 701 is input to either a SCSI•I/F-A 704 or SCSI•L/F-B 708 via a signal line 751. The SCSI•I/F-A 704 or the SCSI•L/F-B 708 applies SCSI protocol on the input data, and outputs that data to the connector E 707 via a signal line 754. The connector E 707 is connected to the CPU bus 1054 of the core portion 10. Therefore, the CPU 1003 of the core portion 10 receives from the CPU bus 1054 the data input to the connector for SCSI•I/F (connector A 700 and connector B 701). The data from the CPU 1003 of the core portion 10 is output to the connector for SCSI•I/F by the procedures reverse to the above-described procedures.

A Centronics interface is connected to the connector C 702. A signal arriving at the connector C 702 is input to the Centronics I/F 705 via a signal line 752. The Centronics I/F 705 receives data by a predetermined protocol, and outputs the received data to the connector E 707 via the signal line 754. The connector E 707 is connected to the CPU bus 1054 of the core portion 10. Therefore, the CPU 1003 of the core portion 10 receives from the CPU bus 1054 the data input to the connector for Centronics I/F (connector C702).

A RS232C interface is connected to the connector D 703. A signal arriving at the connector D 703 is input to a RS232C•I/F 706 via a signal line 753. The RS232C•I/F 706 receives data by a predetermined protocol, and outputs the received data to the connector E 707 via the signal line 54. The connector E 707 is connected to the CPU bus 1054 of the core portion 10. Therefore, the CPU 1003 of the core portion 10 receives from the CPU bus 1054 the data input to the connector for RS232C•I/F (connector D 703). The data from the CPU 1003 of the core portion 10 is output to the connector for RS232C•I/F (connector D703) by the procedures reverse to the above-mentioned ones.

Formatter Portion 8

Figure 8:
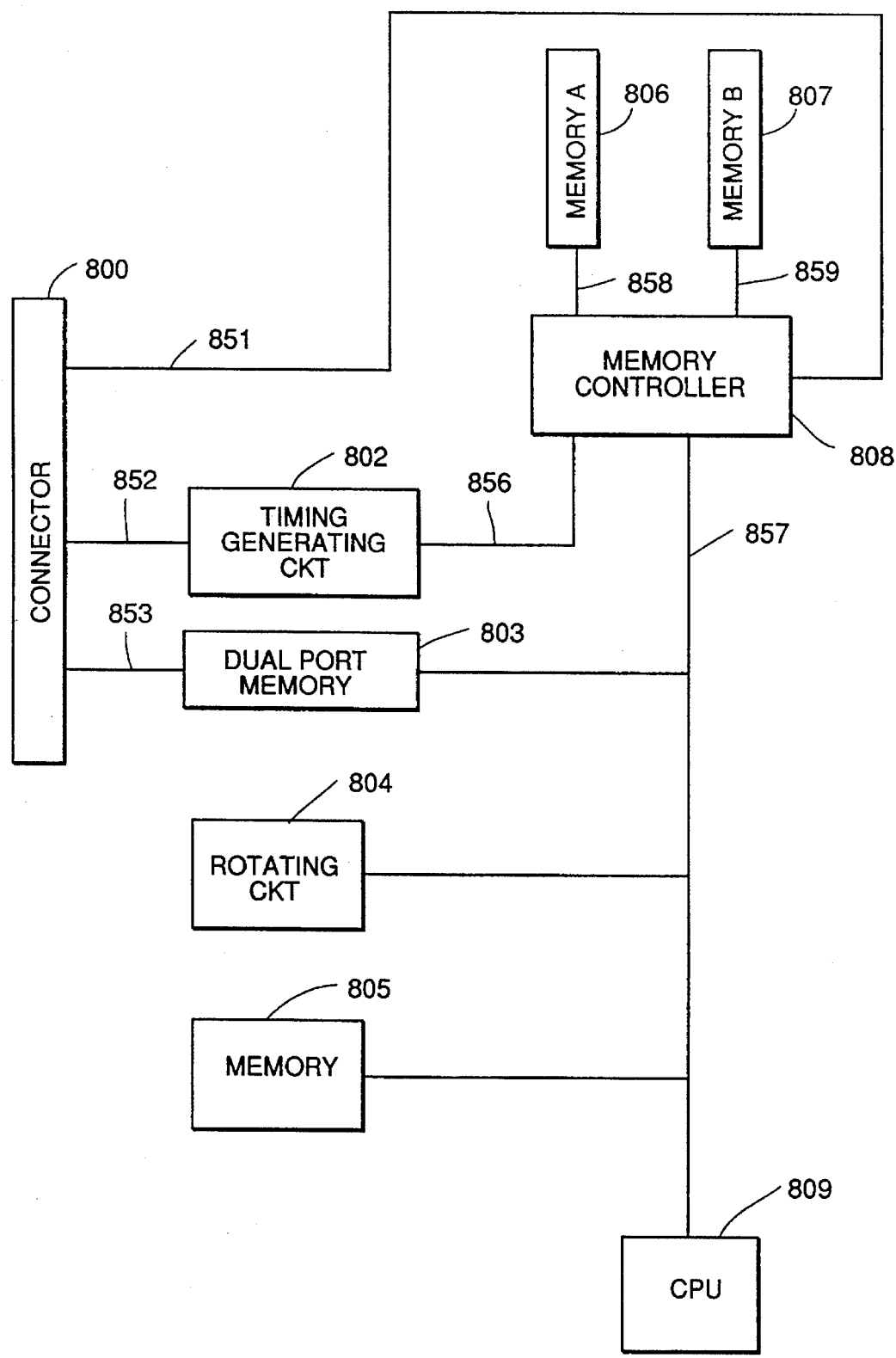
FIG. 8 is a block diagram of a formatter portion.

The formatter portion 8 will be described with reference to FIG. 8.

Determination on the above-described data from the computer interface portion 7 is made in the core portion 10. If the data from the computer interface portion 7 is associated with the formatter portion 8, the CPU 1003 of the core portion 10 transfers the data from the computer to a dual port memory 803 via the connector 1008 of the core portion 10 and a connector 800 of the formatter portion 8. A CPU 809 of the formatter portion 8 receives through the dual port memory 803 the code data which has arrived from the computer. The CPU 809 sequentially converts the coded data into image data, and stores the image data in either a memory A 806 or a memory B 807 through a memory controller 808. Each of memories A 806 and B 807 has a capacity of 1 M bytes, and can store image data corresponding to A4 size at a resolution of 300 dpi. When an image of A3 size is stored at a resolution of 300 dpi, memories A 806 and B 807 are cascade-connected to store image data. Control of memories A 806 and B 807 is performed by the memory controller 808 under the instruction of the CPU 809. When rotation of a character or figure is necessary, the data is rotated by the rotating circuit 804, and the rotated data is transferred to either memory A 806 or memory B 807 under the control of the memory controller 808. When storage of the image data in memory A 806 or B 807 is completed, the CPU 809 connects a data bus line 858 of memory A 806 or a data bus line 859 of memory B 807 to an output line 851 of the memory controller 808 by controlling the memory controller 808. Next, the CPU 809 performs communications with the CPU 1003 of the core portion 10 through the dual port memory 803 to set the operation mode in which image data is output from either memory A 806 or memory B 807. The CPU 1003 of the core portion 10 performs communications with the communication function incorporated in the CPU 122 of the reader portion 1 through the communication circuit 1002 of the core portion 10 to set the CPU 122 in the printing out mode. The CPU 1003 of the core portion 10 activates a timing generating circuit 802 through the connector 1008 and the connector 800 of the formatter portion 8. The timing generating circuit 802 generates a timing signal required to read out the image data from either memory A 806 or memory B 807 in the memory controller 808 in response to the signal from the core portion 10. The image data from memory A 806 or memory B 807 is input to the memory controller 808 through a signal line 858 or 859. The image data output from the memory controller 808 is transferred to the core portion 10 via the signal line 851 and the connector 800. The image data is output from the core portion 10 to the printer 2 in the manner which has been described in connection with the core portion 10.

Image Memory Portion 9

Figure 9:
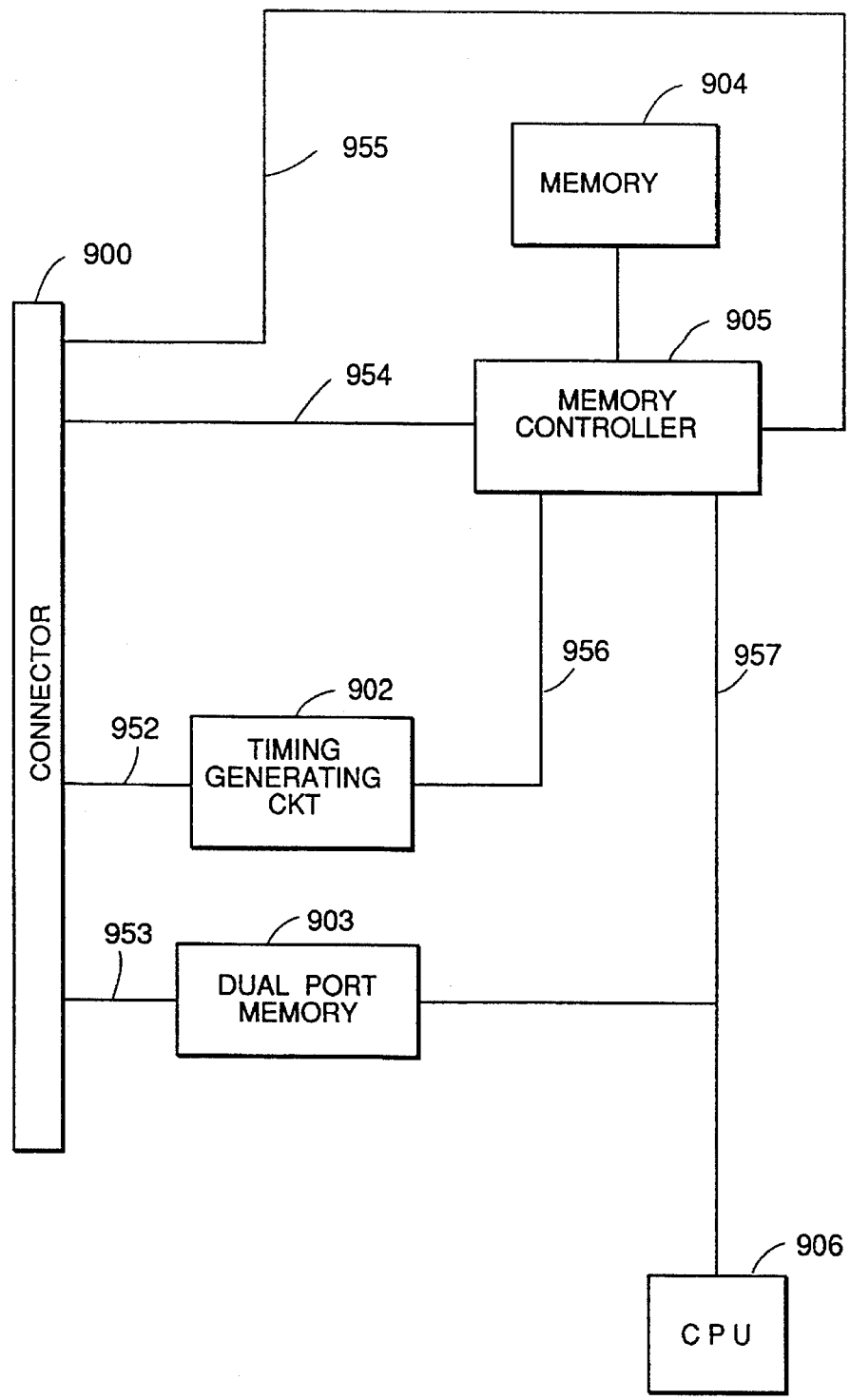
FIG. 9 is a block diagram of an image memory portion.

The image memory portion 9 will be described below with reference to FIG. 9.

The image memory portion 9 is connected to the core portion 10 via a connector 900 to exchange various signals. A multilevel input signal on a signal line 954 is stored in a memory 904 under the control of a memory controller 905. The memory controller 905 has three functions consisting of (1) the mode in which data is exchanged between the memory 904 and a CPU bus 957 under the instruction of a CPU 906, (2) the mode in which the signal on the signal line 954 is stored in the memory 904 under the control of a timing generating circuit 902, and (3) the mode in which the contents of the memory 904 are read out and output to a signal line 955. The memory 904 has a capacity of 32 M bytes, and can store the image corresponding to A3 size at a resolution of 400 dpi and at 256 gray-scale levels. The timing generating circuit 902 is connected to the connector 900 via a signal line 952. The timing generating circuit 902 is activated by a control signal (HSYNC, HEN, VSYNC, VEN) from the core portion 10 to generate signals which achieve the following two functions: one, the function of storing the data from the core portion 10 in the memory 904, and the other, the function of reading out data from the memory 904 and of transferring the read data to the signal line 955. A dual port memory 903 is connected to the CPU 1003 of the core portion 10 via a signal line 953 and to the CPU 906 of the image memory portion 9 via a signal line 957. The respective CPU exchange commands through the dual port memory 903.

Image data is stored in the image memory portion 9 in the manner described below: an 8-bit multilevel image signal from the reader portion 1 is input to the connector 900. The input image signal is input to the memory controller 905 via the signal line 954. The timing generating circuit 902 generates a timing signal on the basis of the signal which has been transmitted from the core portion 10 via the signal line 952, and transfers the generated timing signal to the memory controller 905 via the signal line 956. The memory controller 905 stores the signal on the signal line 954 in the memory 904 according to that timing signal. The CPU 906 connects the memory 904 to the CPU bus 957 by controlling the memory controller 905. The CPU 906 reads out the image data from the memory 904 in sequence, and transfers the read image data to the dual port memory 903. The CPU 1003 of the core portion 10 reads the image data in the dual port memory 903 of the image memory portion 9 via the signal line 953 and through the connector 900, and transfers that data to the computer interface portion 7. The image data is transferred from the computer interface portion 7 to a computer in the manner which has been described above.

The image data from a computer is output to the printer 2 in the manner described below: the image data from the computer arrives at the core portion 10 through the computer interface portion 7. The CPU 1003 of the core portion 10 transfers that image data to the dual port memory 903 of the image memory portion 9 via the CPU bus 1054 and the connector 1009 (as shown in FIG. 4). At that time, the CPU 906 connects the CPU bus 957 to the bus of the memory 904 by controlling the memory controller 905. The CPU 906 transfers the image data in the dual port memory 903 to the memory 904 through the memory controller 905. When image data transfer to the memory 904 has been completed, the CPU 906 connects the data line of the memory 904 to the signal line 955 by controlling the memory controller 905. The CPU 906 performs communications with the CPU 1003 of the core portion 10 through the dual port memory 903 to set the mode in which the image is output for printing from the memory 904 through the core portion 10. After setting, the CPU 906 activates the timing generating circuit 902 to output a predetermined timing signal to the memory controller 905 via the signal line 956. The memory controller 905 reads out the image data from the memory 904 synchronously with the signal from the timing generating circuit 902, and outputs the read image data to the connector 900 via the signal line 955. The image data is output from the connector 900 to the printer 2 in the manner which has been described in connection with the core portion 10.

The mark sheet used for image retrieval is processed in the manner described below.

Figure 10:
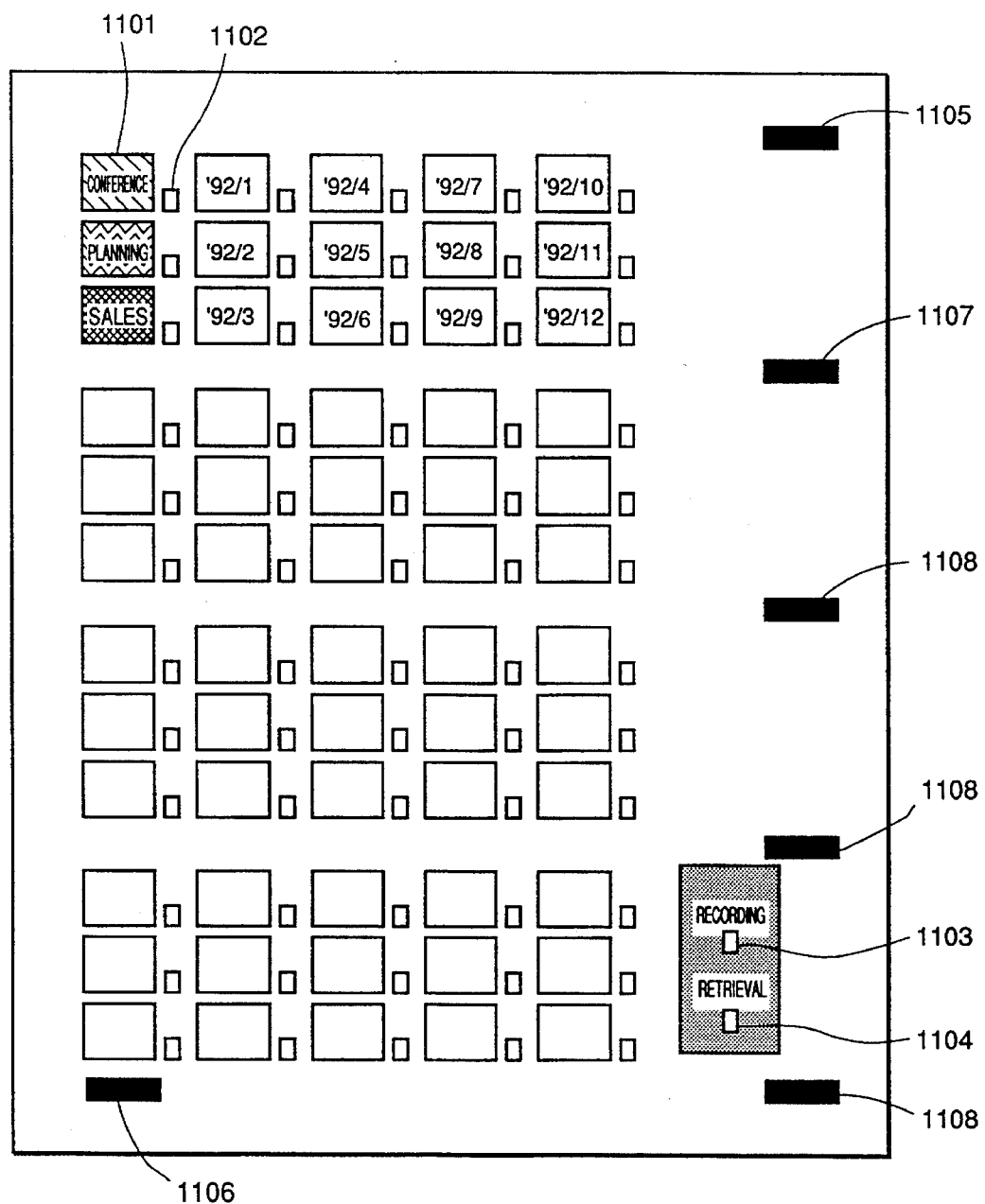
FIG. 10 illustrates a mark sheet.

FIG. 10 shows an example of a printed mark sheet.

1101 denotes data which is used to identify the image stored in the storage medium (magnetic-optical disk) inserted into the external storage device 6 of the file portion 5, and which is one of index cells serving as the keywords for classifying the document image data stored in the storage medium.

1102 denotes a check column used to select the corresponding index cell 1101. The operator selects a desired index cell by blackening the check column with a pencil or the like.

1103 denotes a check column used to select the mode in which an image is stored.

1104 denotes a check column used to select the mode in which an image is retrieved.

1105 and 1106 denote marks used to indicate the mark sheet and to detect and correct the positional shift of the mark sheet.

1107 denotes a mark used to identify the direction of the mark sheet and to detect and correct the positional shift of the mark sheet. 1108 denotes a mark used to detect and correct the positional shift of the mark sheet.

Figure 11:
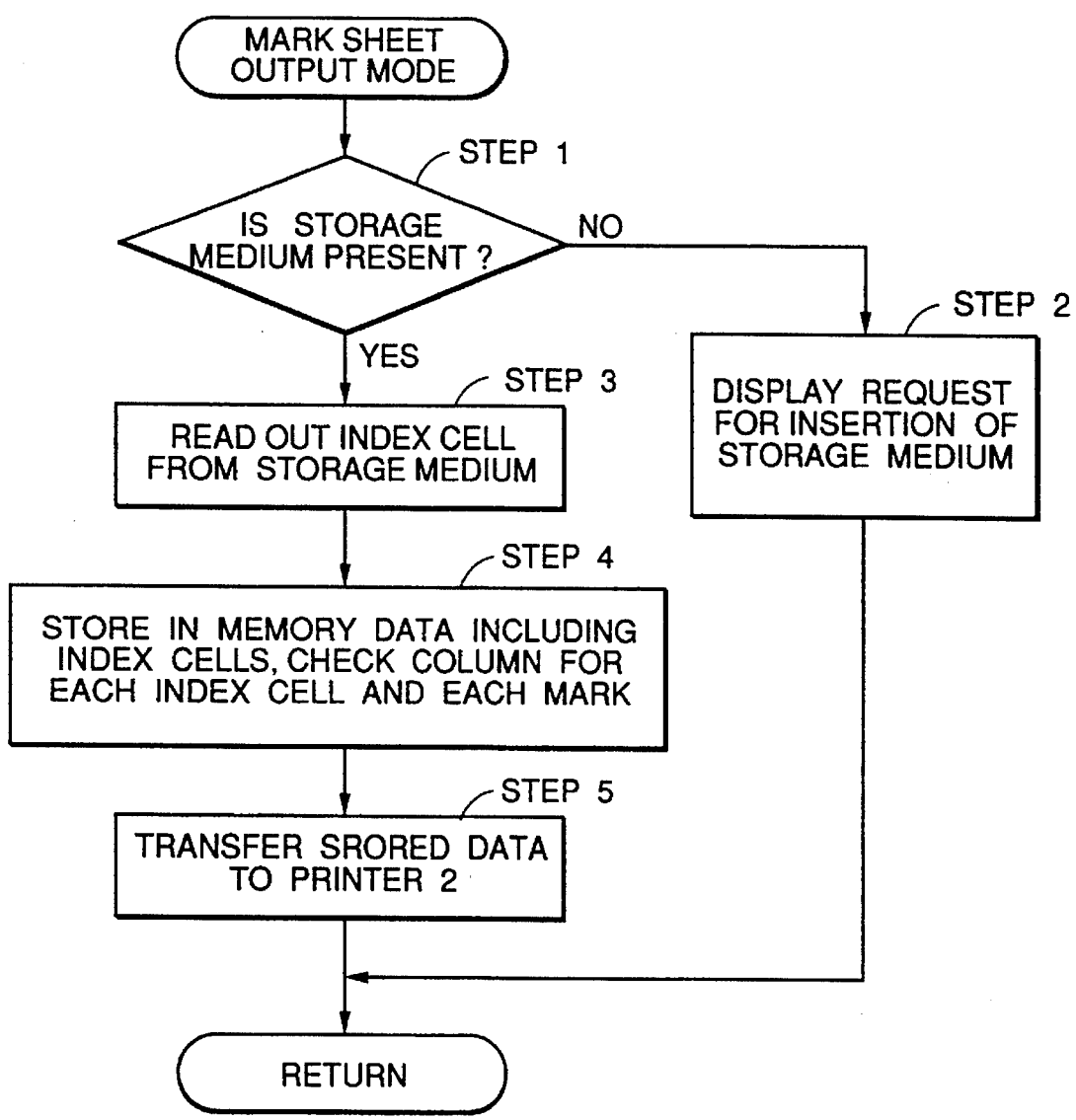
FIG. 11 is a flowchart showing the operation of a mark sheet output mode.

The way in which the mark sheet is created will be described below with reference to FIG. 11. When the mark sheet is created, the mark sheet output mode is set from the operating portion 124 of the reader portion 1. Thereafter, it is determined whether or not the storage medium is inserted into the external storage device 6 of the file portion 5 (step 1). If the storage medium is not inserted, request for insertion of the storage medium is displayed on a displaying device of the operating portion 124 of the reader portion 1 (step 2). If the storage medium is inserted into the external storage device 6, the index cell data stored in a predetermined area of the storage medium is read out, and the read index cell data is stored in any of memories A 506 through D 509 (step 3). The format of the mark sheet having the check column 1102 used to select a desired index cell and the check columns 1103 and 1104 used to select execution of recording or retrieval is read out from a ROM (not shown) under the instruction of the CPU 516, and the read format is stored in any of memories A 506 through D 509 by bit mapping. Various items are added to the data on the mark sheet stored in the memory, including index cells, the check columns used to select the corresponding index cells, the marks 1105 and 1106 used to identify the mark sheet, the mark 1107 used to determine the direction of the mark sheet and the marks 1108 used to detect and correct the positional shift of the document which has occurred when the mark sheet is read in (step 4). Thereafter, the data stored in the memory is transferred to the printer 2 by the aforementioned method (step 5), whereby the mark sheet is output from the printer portion 2.

Figure 12:
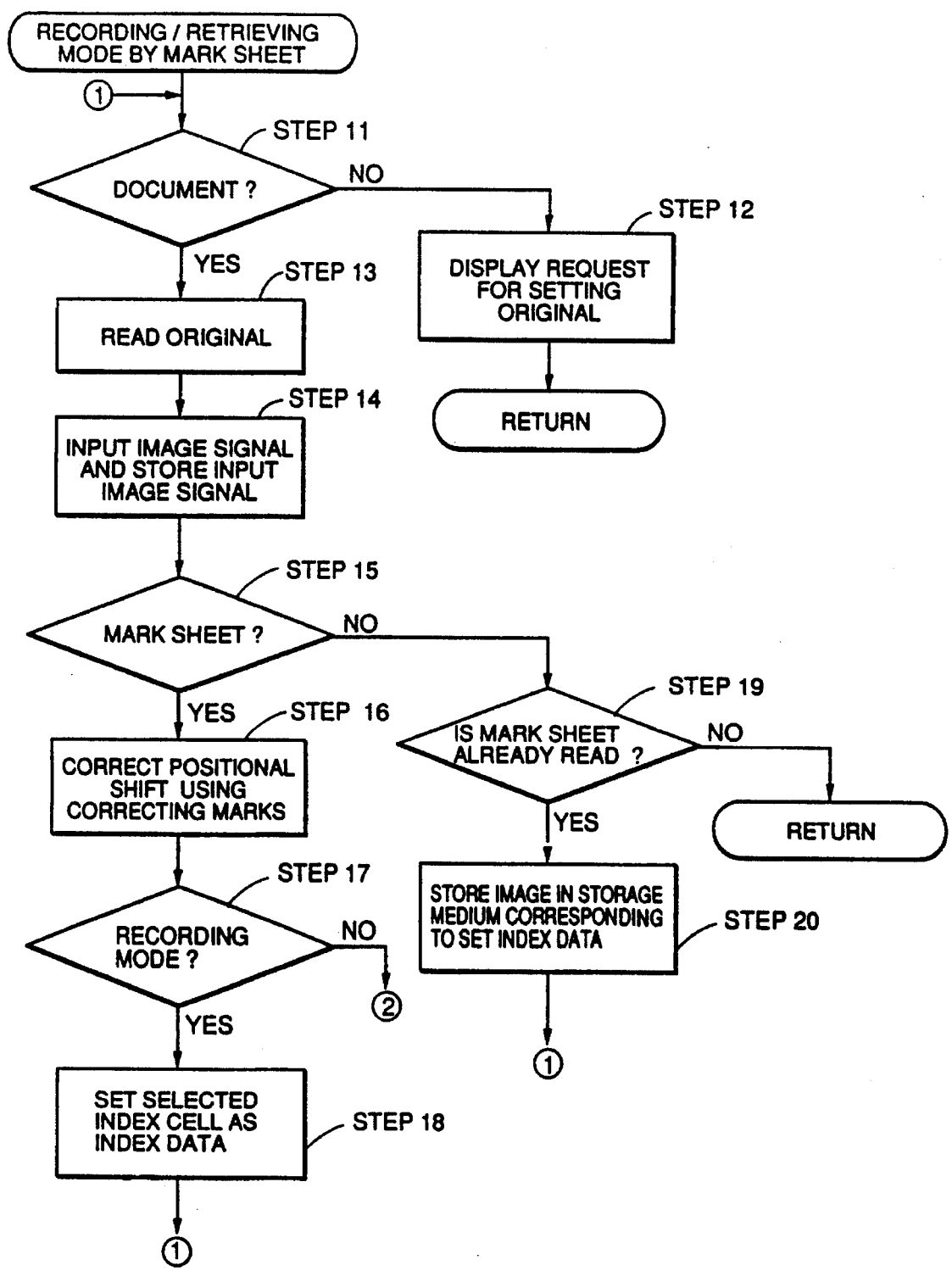
FIG. 12 is a flowchart showing the operation of a recording/retrieving mode by the mark sheet.
Figure 13:
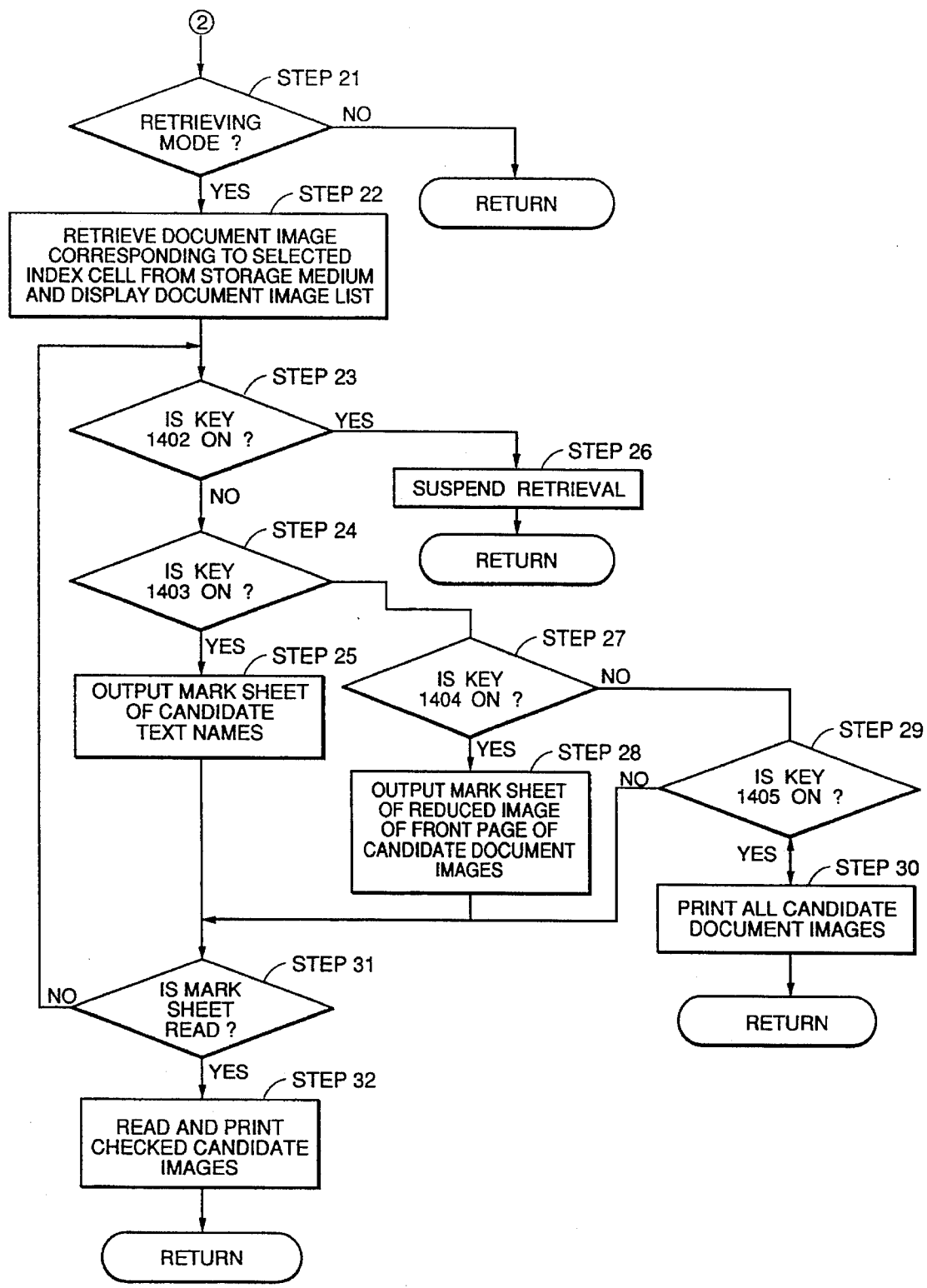
FIG. 13 is a flowchart showing the operation of a recording/retrieving mode by the mark sheet.

Recording and retrieval of the document image using the mark sheet will be described with reference to FIGS. 12 and 13.

To record an image in the storage medium, the check column 1103 for recording on the mark sheet is checked and the check column of a desired index cell is checked by the operator. Thereafter, the document to be recorded is read from the reader portion 1 together with the mark sheet.

For retrieval, the check column 1104 for retrieval is checked and the check column of a desired index cell is checked by the operator. That mark sheet is read from the reader portion 1. These recording and retrieving modes can also be set from the operating portion 124 of the reader portion 1. If the setting by the mark sheet differs from the setting by the operating portion, an error display is performed.

First, it is determined whether or not there is a document set on the feeding device 101 (step 11). If there is no document, a request for setting a document is displayed (step 12). If there is a document, that document set on the feeding device 101 is fed onto the platen in order to read the document image (step 13).

The image data on the document which has been read by the reader portion 1 is fed to the file portion 5 and is then stored in any of memories A 506 through D 509 (step 14). The CPU 506 determines whether or not the image data stored in any of memories A 506 through D 509 is an image of the mark sheet, by determining whether or not there is the mark sheet identifying mark 1105 or 1106 (step 15).

Generally, there is a positional shift between the read image of the mark sheet and the format stored in any of memories A 506 through D 509, caused by a shift in the position at which the document is placed on the platen of the reader portion 1 (the shift including longitudinal and lateral shifts and rotation) or the expansion/contraction of the mark sheet. Hence, if it is determined that the document read by the reader portion 1 is a mark sheet, the positional shift is corrected using the positional shift correcting marks 1105, 1106, 1107 and 1108 (step 16).

If the check column 1103 for the recording mode has been checked, a subsequently read document is stored in the storage medium of the external storage device 6 according to the classification of the selected index cell.

The process of step 16 in which the positional shift is corrected will be described in detail. If there is the mark sheet direction identifying mark 1107 immediately below the mark sheet identifying mark 1105 located right and above on the mark sheet, it is determined that the mark sheet is directed correctly. If there is not the mark 1107, i.e., if the mark sheet is identified using the mark 1106, it is determined that the mark sheet is positioned upside down.

Practically, the longitudinal or lateral positional shift is measured on the basis of the image data by measuring how much the positional shift correcting marks 1105, 1107 and 1108 shift from the format used to print out the mark sheet in the longitudinal or lateral direction. To measure the skew, how much the mark sheet skews from the format used to print out the mark sheet is measured using the image data on the two marks located adjacent to each other in the vertical direction in the positional shift correcting marks 1105, 1107 and 1108. The expansion/contraction of the mark sheet in the longitudinal direction is measured by measuring how much the mark sheet is expanded or contracted in the longitudinal direction from the format used to print out the mark sheet, using the image data on the two marks in the positional shift correcting marks 1105, 1107 and 1108, which are located adjacent to each other in the vertical direction. Regarding the expansion/contraction of the mark sheet in the lateral direction, how much the mark sheet is expanded or contracted in the lateral direction from the format used to print out the mark sheet using the image data on the marks 1106 and 1108. Since the position of each of the check columns of the index cells and the position of each of the check columns of the recording and retrieval modes can be predicted from the obtained measured values, the positional shift of the mark sheet can be corrected by changing the address of the image data. That is, to correct the direction of the mark sheet, the data is read out in a reverse order from the memory and the read data is stored again.

It is determined whether or not the check column 1103 for the recording mode on the mark sheet has been checked (step 17). If the check column has been checked, the check column 1102 and the checked index cell are set as the index data (step 18). The document read in subsequent to the mark sheet is stored in the storage medium of the external storage device 6 corresponding to the selected index cell (steps 19 and 20).

At that time, when it is determined that the mark sheet is located upside down, the data indicating that the document image is upside down is stored in the storage medium of the external storage device 520 together with the document image according to the classification of the selected index cell.

It is determined whether or not the check column 1104 for the retrieval mode has been checked (step 21). If the check column 1104 has not been checked, the process is returned. If the check column 1104 has been checked, the storage medium of the external storage device 6 is retrieved, and a list of document images corresponding to the index cells whose check column 1102 has been checked is displayed on the display device of the operating portion 124 (step 22).

Figure 14:
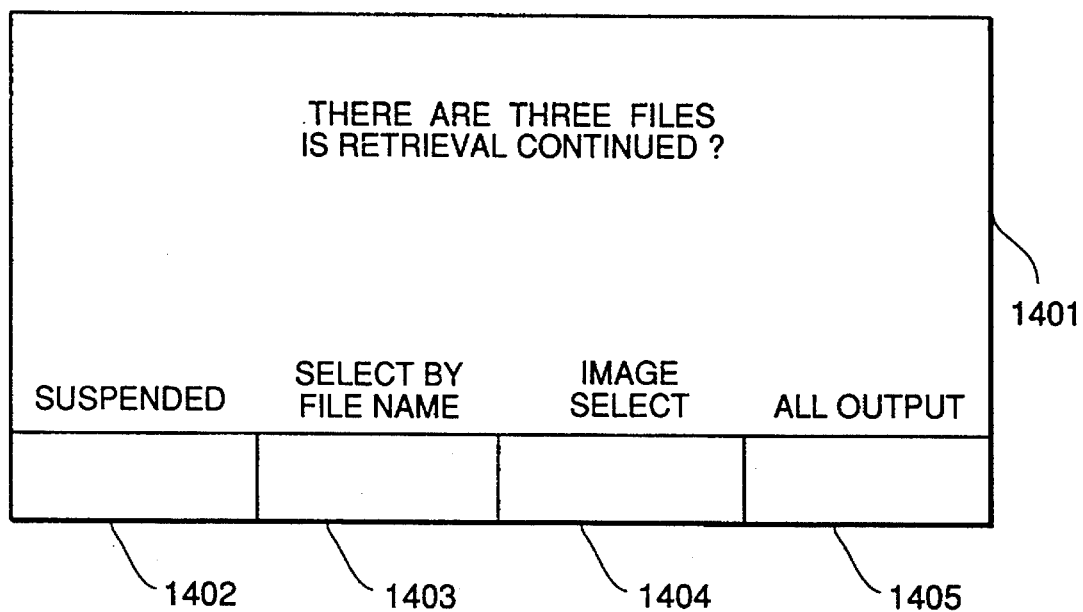
FIG. 14 illustrates an example of display for retrieval.

If there are a plurality of document images, a message indicating that there are a plurality of candidate documents is displayed on a display portion 1401 of the operating portion 124 together with the number of document images, as shown in FIG. 14. Thereafter, the operator inputs suspension of the retrieval, output of the mark sheet of the list of file names of the selected documents, the output of the mark sheet of the selected images or the output of all the document images from selection keys 1402, 1403, 1404 or 1405 (steps 23, 24, 27, 29).

When the selection key 1402 is pressed, retrieval is suspended (step 26). When the selection key 1403 is pressed, a mark sheet with the file names of the selected document images synthesized in the check columns 1101 thereof is output from the printer portion 2 (step 25). This mark sheet shown in FIG. 15 has a format different from that of the mark sheet shown in FIG. 10.

Figure 16:
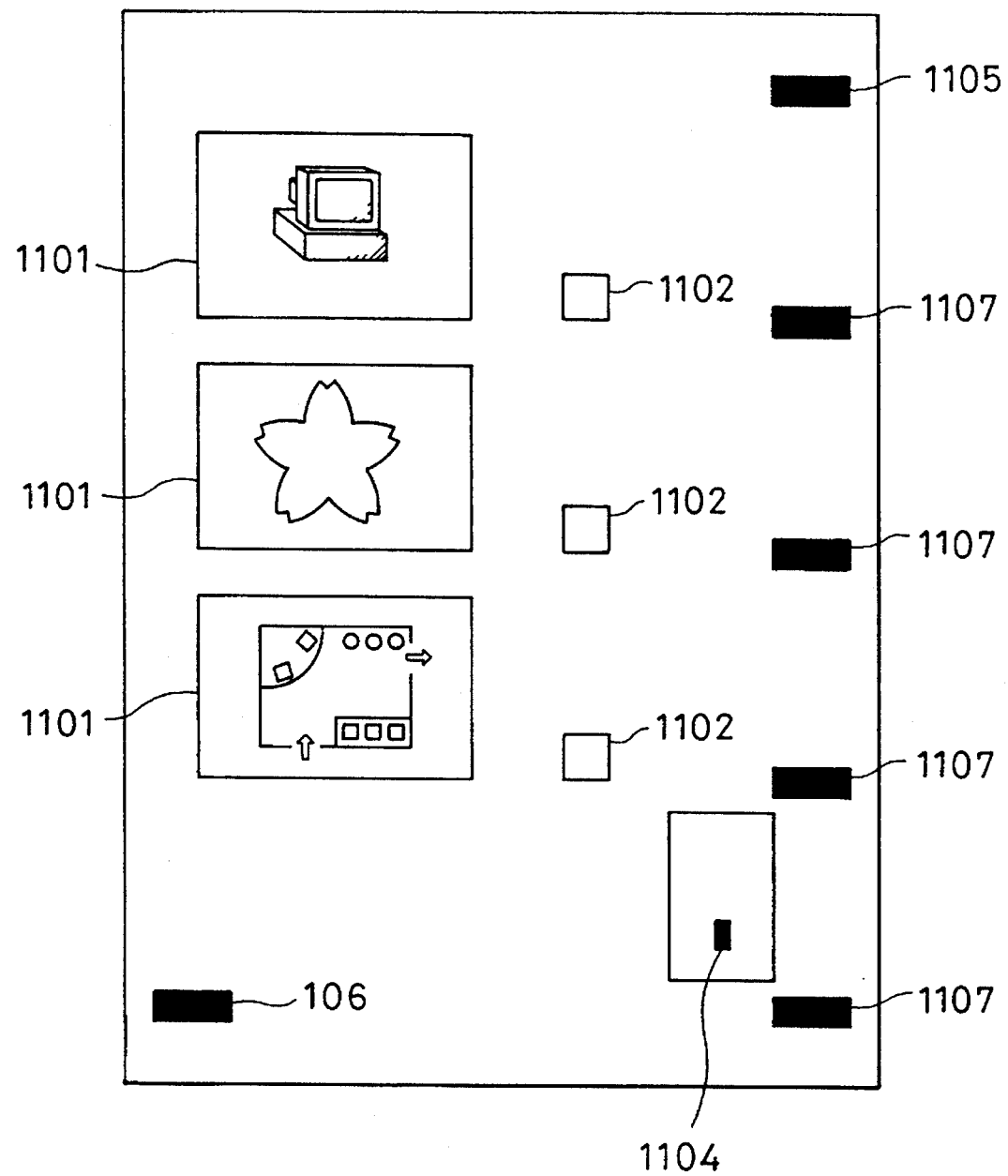
FIG. 16 illustrates a mark sheet for a secondary retrieval.

When the selection key 1404 is pressed, a mark sheet having a format shown in FIG. 16 with reduced images of the first pages of the selected document images synthesized in the check columns 1101 is output from the printer portion 2 (step 28).

When the selection key 1405 is pressed, the selected document images are sequentially read out from the storage medium and output from the printer portion 2 (step 30).

Figure 15:
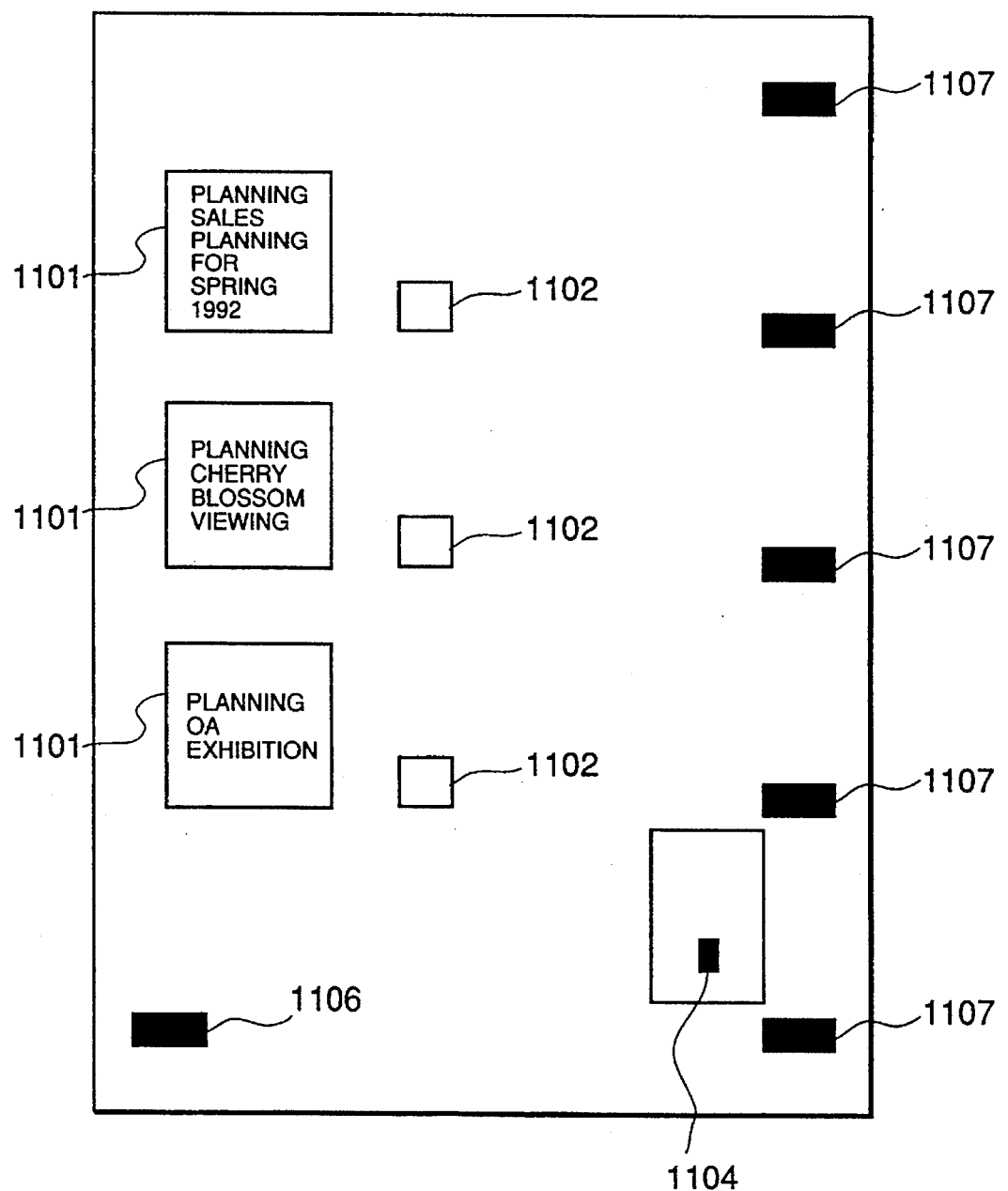
FIG. 15 illustrates a mark sheet for a secondary retrieval.

After the mark sheet shown in FIG. 15 or 16 has been output by pressing of the selection key 1403 or 1404, a desired document image selected from the mark sheet can be retrieved by checking the check column 1102 corresponding to the desired document image and by making the reader portion 1 read that mark sheet (steps 31 and 32).

In place of display of the message indicating that there are a plurality of files in the operating portion 124, as shown in FIG. 14, selected file names or images may be output on the mark sheet.

On the mark sheet shown in FIG. 16, the reduced images of the first pages of the document images are indicated in the check columns. However, a specific page selected from the plurality of pages may be designated when the image is selected, and the image of that designated page may be recorded in the check column of the mark sheet. Alternatively, a desired reduction factor and a desired area may be designated beforehand, and the reduced image of the designated area may be recorded in the check column of the mark sheet to facilitate retrieval.

If the document image retriever has a terminal which can exchange images with the above-described apparatus, the retriever can retrieve the document images from a remote site by using, for example, a FAX terminal in place of the reader portion 1 and printer portion 2 for reading and printing the mark sheet.

It is to be noted that the invention is not limited by any of the details of description and various changes and modifications may be made in the invention without departing from the spirit and scope thereof.

What is claimed is:

1. An image storing apparatus for storing an image in a storage medium on the basis of data written on a mark sheet having a marking area used to set index data, said image storing apparatus comprising:

reading means for reading an image of the mark sheet;

a memory for storing the image of the mark sheet which has been read by said reading means;

discrimination means for discriminating whether the mark sheet was read upside down on the basis of special data contained in the image of the mark sheet which has been read by said reading means;

correction means for correcting a positional relation of top and bottom of the image of the mark sheet which has been stored in said memory when said discrimination means discriminates that the mark sheet was read upside down; and setting means for detecting a marked marking area on the basis of the image of the mark sheet which has been corrected by said correction means and for setting the index data of the image to be stored in said storage medium.

2. The image storing apparatus according to claim 1, wherein said correction means changes an address of the image of the mark sheet which has been stored in said memory.

3. The image storing apparatus according to claim 1, wherein said discrimination means discriminates whether the mark sheet was read upside down by determining whether or not the special data is present at a predetermined position.

4. The image storing apparatus according to claim 1, further comprising determination means for determining whether or not the image read by said reading means is a mark sheet, and wherein when said determination means determines that the read image is the mark sheet, said discrimination means discriminates whether the mark sheet was read upside down.

5. An image retrieving apparatus for retrieving an image stored in a storage medium on the basis of data written on a mark sheet having a marking area used to set index data, said image retrieving apparatus comprising:

reading means for reading an image of the mark sheet;

a memory for storing the image of the mark sheet which has been read by said reading means;

discrimination means for discriminating whether the mark sheet was read upside down on the basis of special data contained in the image of the mark sheet which has been read by said reading means;

correction means for correcting a positional relation of top and bottom of the image of the mark sheet which has been stored in said memory when said discrimination means discriminates that the mark sheet was read upside down; and setting means for detecting the marked marking area on the basis of the image of the mark sheet which has been corrected by said correction means and for setting the index data of the image to be retrieved from said storage medium.

6. The image retrieving apparatus according to claim 5, wherein said correction means changes an address of the image of the mark sheet which has been stored in said memory.

7. The image retrieving apparatus according to claim 5, wherein said discrimination means discriminates whether the mark sheet was read upside down by determining whether or not the special data is present at a predetermined position.

8. The image retrieving apparatus according to claim 5, further comprising determination means for determining whether or not the image read by said reading means is a mark sheet, and wherein when said determination means determines that the read image is the mark sheet, said discrimination means discriminates whether the mark sheet was read upside down.

9. A method of creating a mark sheet on which an index image used to store an image in a storage medium or to retrieve the image from said storage medium is set, said method comprising the steps of:

a) reading out a plurality of index image items stored in said storage medium and storing the read index image items in a memory in a predetermined format, wherein each of the plurality of index image items can be used as an index of a plurality of images stored in said storage medium;

b) generating image data representing a plurality of marking areas, each of which is used to designate each of the plurality of index image items;

c) synthesizing the image data generated in said step (b) with the plurality of index image items stored in said memory in said predetermined format so that each of the plurality of index images corresponds to each of the plurality of marking areas; and d) creating the mark sheet on the basis of the data synthesized in said step (c).

10. The method of creating a mark sheet according to claim 9, further including a step of generating identifying data identifying the mark sheet and positional data used to detect a positional error of the mark sheet, and wherein in said step (c), the generated identifying data and positional data is also synthesized with the plurality of index image items stored in said memory.

11. The method of creating a mark sheet according to claim 9, wherein in said step (a), images indicating said plurality of index image items are stored in a matrix form.

12. An image retrieving apparatus comprising:

input means for inputting retrieval data;

retrieval means for retrieving images from a storage medium on the basis of the retrieval data input by said input means;

creating means for creating a mark sheet having a plurality of marking areas in which a checkmark indicating each of a plurality of images that have been retrieved by said retrieval means is marked; and reading means for reading an image of the mark sheet created by said creating means, wherein said retrieval means further retrieves the image in the plurality of images on the basis of the checkmark marked by an operator in the marking area of the image of the mark sheet which has been read by said reading means.

13. The image retrieving apparatus according to claim 12, wherein said creating means reads out from said storage medium index data corresponding to each of the plurality of images retrieved by said retrieving means, and creates the mark sheet on the basis of the index data read from said storage medium.

14. The image retrieving apparatus according to claim 13, wherein said index data read from said storage medium includes a file name of the retrieved image.

15. The image retrieving apparatus according to claim 13, wherein said index data read from said storage medium includes a reduced image of the retrieved image.

16. An image retrieving apparatus comprising:

creating means for creating a mark sheet including a plurality of index data for retrieving an image stored in a storage medium and a plurality of marking areas in which marks for selecting each of said plurality of index data should be written; and selecting means for selecting a first mode for outputting character information for discriminating a stored image as the index data contained in said mark sheet or a second mode for outputting image information for discriminating said stored image as the index data contained in said mark sheet, wherein said creating means creates a mark sheet in accordance with the mode selected by said selecting means.

17. The image retrieving apparatus according to claim 16, wherein said creating means outputs character information indicating a title of the image stored in said storing medium as index data in said first mode and outputs a reduced image of the image stored in said storing medium as index data in said second mode.

18. The image retrieving apparatus according to claim 17, wherein said creating means outputs the reduced image of the first page of the image stored in said storage medium as index data in said second mode.

19. A controlling method in an image storing apparatus comprising the steps of:

reading an image of a mark sheet having a marking area to be used to set index data;

storing the read image in a memory;

determining whether the mark sheet was read upside down on the basis of special data contained in the image of the mark sheet;

correcting a positional relation of top and bottom of the image of the mark sheet which has been stored in said memory when it is determined that the mark sheet was read upside down;

detecting the marked marking area on the basis of the image of the mark sheet which has been corrected; and setting index data of the image to be stored in a storage medium.

20. The controlling method according to claim 19, wherein in said correcting step an address of the image of the mark sheet which has been stored in said memory is corrected.

21. The controlling method according to claim 19, wherein in said determining step, the determination whether or not the mark sheet was read upside down is made by determining whether said special data is in a predetermined place.

22. A controlling method in an image retrieving apparatus comprising the steps of:

reading an image of a mark sheet having a marking area to be used to set index data;

storing the read image in a memory;

determining whether the mark sheet was read upside down on the basis of special data contained in the image of the mark sheet;

correcting a positional relation of top and bottom of the image of the mark sheet which has been stored in said memory when it is determined that the mark sheet was read upside down;

detecting the marked marking area on the basis of the image of the mark sheet which has been corrected; and setting index data of the image to be retrieved from a storage medium.

23. A controlling method according to claim 22, wherein in said correcting step an address of the image of the mark sheet which has been stored in said memory is corrected.

24. A controlling method according to claim 22, wherein in said determining step, the determination whether or not the mark sheet was read upside down is made by determining whether said special data is in a predetermined place.

25. A controlling method in an image retrieval apparatus comprising the steps of:

inputting retrieval data;

retrieving images from a storage medium based on input retrieval data;

creating a mark sheet having a plurality of marking areas in which a checkmark designating each of a plurality of images that have been retrieved is marked;

reading the image of the created mark sheet; and retrieving the image from said plurality of images on the basis of the checkmark marked by an operator in the marking area of the image of the mark sheet which has been read by said reading means.

26. A controlling method according to claim 25, wherein in said creating step index data corresponding to a plurality of images which have been retrieved is read from said storage medium, and a mark sheet is created on the basis of the read index data.

27. A controlling method in an image retrieval apparatus comprising the steps of:

selecting a first mode for outputting character information for discriminating the image stored in a storage medium as the index data contained in a mark sheet or a second mode for outputting image information for discriminating said stored image as the index data contained in said mark sheet; and generating index data in accordance with the selected mode and creating a mark sheet.

28. A controlling method according to claim 27, wherein in said generating step, when a first mode is selected, character information indicating a title of the image stored in said storage medium as index data is generated, and when a second mode is selected, the reduced image of the image stored in said storage as index data is generated.

* * * * *

UNITED STATES PATENT AND TRADEMARK OFFICE
CERTIFICATE OF CORRECTION

PATENT NO. : 5,579,419

DATED : November 26, 1996

INVENTORS : HIROYUKI YAGUCHI ET AL.   Page 1 of 4

It is certified that error appears in the above-identified patent and that said Letters Patent is hereby corrected as shown below:

ON TITLE PAGE : Item [30]

Foreign Application Priority Data

"64-126142" should read --4-126142--.

Attorney, Agent or Firm: On the title page:

"Fitzpatrick, Cella Harper & Scinto" should read
    --Fitzpatrick, Cella, Harper & Scinto--.

COLUMN 5

Line 14, "a" should read --an--.

COLUMN 6

Line 51, "outputs" should read --outputting--.

COLUMN 8

Line 51, "lien" should read --line--.

UNITED STATES PATENT AND TRADEMARK OFFICE
CERTIFICATE OF CORRECTION

PATENT NO. : 5,579,419

DATED : November 26, 1996

INVENTORS : HIROYUKI YAGUCHI ET AL.

It is certified that error appears in the above-identified patent and that said Letters Patent is hereby corrected as shown below:

COLUMN 9

Line 66,   "below: first," should read --below. First,--.

COLUMN 10

Line 20,   "A,405" should read --A 405--;
   Line 21,   "D,408" should read --D 408--.

COLUMN 13

Line 14,   "below:" should read --below.--;
   Line 26,   "memorycontroller" should read --memory controller--;
   Line 66,   "computer one-to-one" should read --computer in a one-to-one--.

COLUMN 14

Line 30,   "54." should read --754.--;
   Line 56,   "memories" should read --the memories-- and "bytes," should read --byte--.

UNITED STATES PATENT AND TRADEMARK OFFICE
CERTIFICATE OF CORRECTION

PATENT NO.  : 5,579,419

DATED       : November 26, 1996

INVENTORS   : HIROYUKI YAGUCHI ET AL.

It is certified that error appears in the above-identified patent and that said Letters Patent is hereby corrected as shown below:

<u>COLUMN 15</u>

Line 55,   "CPU" should read --CPUs--;
   Line 59,   "below: an" should read --below.  An--.

<u>COLUMN 16</u>

Line 13,   "below: the" should read --below.  The--.

<u>COLUMN 17</u>

Line 22,   "marks" should read --mark--.

<u>COLUMN 18</u>

Line 33,   after "1108" insert --is discussed below--.

UNITED STATES PATENT AND TRADEMARK OFFICE
CERTIFICATE OF CORRECTION

PATENT NO. : 5,579,419

DATED : November 26, 1996

INVENTORS : HIROYUKI YAGUCHI ET AL.

It is certified that error appears in the above-identified patent and that said Letters Patent is hereby corrected as shown below:

<u>COLUMN 18</u> continued

Line 45,   delete "in".

<u>COLUMN 19</u>

Line 49,   "by" should read --to--;
   Line 50,   "of" should read --of the--.

Signed and Sealed this

Twenty-seventh Day of May, 1997

Attest:

BRUCE LEHMAN

*Attesting Officer*      *Commissioner of Patents and Trademarks*